US012795098B2

(12) United States Patent
Ma et al.

(10) Patent No.: US 12,795,098 B2
(45) Date of Patent: Nov. 10, 2026

(54) AS-NEEDED ADDITIONAL DATA TRANSMISSION FOR INFERENCE FOR VIDEO CODING FOR MACHINES

(71) Applicant: QUALCOMM Incorporated, San Diego, CA (US)

(72) Inventors: Liangping Ma, San Diego, CA (US); Nikolai Konrad Leung, San Francisco, CA (US); Thomas Stockhammer, Bergen (DE); Imed Bouazizi, Frisco, TX (US); Lindsey Makana Kostas, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 57 days.

(21) Appl. No.: 18/643,559

(22) Filed: Apr. 23, 2024

(65) Prior Publication Data

US 2024/0364889 A1 Oct. 31, 2024

Related U.S. Application Data

(60) Provisional application No. 63/498,733, filed on Apr. 27, 2023, provisional application No. 63/498,201, filed on Apr. 25, 2023.

(51) Int. Cl.
*H04N 19/127* (2014.01)
*H04N 19/136* (2014.01)
(Continued)

(52) U.S. Cl.
CPC ......... *H04N 19/127* (2014.11); *H04N 19/136* (2014.11); *H04N 19/426* (2014.11); *H04N 19/43* (2014.11); *H04N 19/172* (2014.11)

(58) Field of Classification Search
CPC .. H04N 19/127; H04N 19/136; H04N 19/426; H04N 19/43; H04N 19/172
See application file for complete search history.

(56) References Cited

U.S. PATENT DOCUMENTS 11,275,987 B1 * 3/2022 Gottin .................. G06F 3/0634
11,887,360 B2 * 1/2024 Yang ..................... G06V 10/82
(Continued)

OTHER PUBLICATIONS

International Search Report and Written Opinion—PCT/US2024/025969—ISA/EPO—Aug. 5, 2024.
(Continued)

*Primary Examiner* — Tracy Y. Li
(74) *Attorney, Agent, or Firm* — Shumaker & Sieffert, P.A.

(57) ABSTRACT

A first device may perform a first part of a computing graph to extract a feature map from media (e.g., video) data. The first device may buffer the media data and compress the feature map. The first device may then send the compressed feature map to a second device, which may perform a second part of the computing graph (e.g., processing tasks), e.g., to perform object detection or other such tasks. The second device may request at least a portion of the buffered media data when needed, e.g., to improve accuracy of the second part of the computing graph/processing tasks. Thus, the second device may send a request to the first device for the at least portion of the buffered media data, then perform the second part of the computing graph using the buffered media data and the received feature map.

30 Claims, 11 Drawing Sheets

(51) Int. Cl.

| | |
|---|---|
| ***H04N 19/172*** | (2014.01) |
| ***H04N 19/426*** | (2014.01) |
| ***H04N 19/43*** | (2014.01) |

(56) References Cited

U.S. PATENT DOCUMENTS

| | | | | |
|---|---|---|---|---|
| 2019/0043201 | A1* | 2/2019 | Strong | G06V 10/96 |
| 2019/0109926 | A1* | 4/2019 | Hotchkies | H04L 67/63 |
| 2021/0266145 | A1 | 8/2021 | Chen et al. | |
| 2022/0108417 | A1* | 4/2022 | Liu | G06T 1/0007 |
| 2022/0327359 | A1 | 10/2022 | Ahuja et al. | |
| 2023/0396810 | A1* | 12/2023 | Ge | G06V 10/82 |
| 2025/0126265 | A1* | 4/2025 | Solovyev | H04N 19/91 |

OTHER PUBLICATIONS

ISO/IEC JTC 1/SC 29/WG2: "Updates on Video Coding for Machines", VCM AHG Chairs, Jul. 20, 2022, pp. 1-15.

Kang Y., et al., "Neurosurgeon: Collaborative Intelligence Between the Cloud and Mobile Edge", ASPLOS '17, Apr. 8-12, 2017, 15 Pages.

Schulzrinne H., et al.,"RTP: A Transport Protocol for Real-Time Applications", IETF RFC 3550, Jul. 2003, XP015009332, 105 pages.

WG 2, MPEG Technical Requirements: "Updates on Video Coding for Machines", International Organization for Standardization organisation Internationale De Normalisation ISO/IEC JTC 1/SC 29/WG 2 MPEG Technical Requirements, ISO/IEC JTC 1/SC 29/WG 2 N00223, Online, Jul. 2022, pp. 1-2.

* cited by examiner

140

AS-NEEDED ADDITIONAL DATA TRANSMISSION FOR INFERENCE FOR VIDEO CODING FOR MACHINES

This application claims the benefit of U.S. Provisional Application No. 63/498,201, filed Apr. 25, 2023, and of U.S. Provisional Application No. 63/498,733, filed Apr. 27, 2023, the entire contents of each of which are hereby incorporated by reference.

TECHNICAL FIELD

This disclosure relates to transport of keypoint data extracted from video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for performing bitrate adaptation when streaming feature data over a network, such as a 5G radio access network (RAN), between task networks. For example, features may be extracted and processed from input video data. The feature extraction and processing tasks may be divided and performed by different devices in different locations. Thus, a first device may extract features from input video data to form a feature map, and perform a first set of processes on the feature map, form an intermediate feature map, then send the intermediate feature map to a second device via a network, e.g., 5G. The second device may then perform the remaining processing tasks on the intermediate feature map.

According to the techniques of this disclosure, the first device may buffer video data from which the intermediate feature map is formed and/or the intermediate feature map itself. The second device may then determine whether the remaining processing tasks can be performed solely from the intermediate feature map, or whether the buffered media data/feature map is needed (or would benefit) the remaining processing tasks. If the buffered video data/feature map is needed or would provide a benefit, the second device may request the buffered data and, after receiving the buffered data, perform the remaining processing tasks using the intermediate feature map and the retrieved buffered data (media data and/or feature sets). For example, the source device may compress the feature set at a reduced compression ratio, then send the reduced compression version of the feature set to the destination device. Additionally or alternatively, the second device may request the buffered data only when a sufficient amount of network bandwidth is available between the first device and the second device. In this manner, bandwidth consumption may be reduced by only sending the buffered data on an as-needed basis.

In one example, a method of processing feature set data formed from media data includes: performing, by a first network entity, a first part of a computing graph on a set of media data to form a feature map, the first part of the computing graph representing first processing tasks performed by the first network entity, wherein a second part of the computing graph corresponds to second processing tasks to be performed by a second network entity; buffering, by the first network entity, at least a portion of the media data; compressing, by the first network entity, the feature map to form a compressed feature map; and sending, by the first entity, the compressed feature map and additional data corresponding to the buffered at least portion of the media data to the second network entity to enable the second network entity to perform the second part of the computing graph using the feature map and the additional data.

In another example, a device for processing feature set data formed from media data includes: a memory configured to store feature set data and media data; and a processing system comprising one or more processors implemented in circuitry, the processing system being configured to: perform a first part of a computing graph on a set of the media data to form a feature map, the first part of the computing graph representing first processing tasks performed by the device, the device comprising a first network entity, wherein a second part of the computing graph corresponds to second processing tasks to be performed by a second network entity; buffer at least a portion of the media data in the memory; compress the feature map to form a compressed feature map; and send the compressed feature map and additional data corresponding to the buffered at least portion of the media data to the second network entity to enable the second network entity to perform the second part of the computing graph using the feature map and the additional data.

In another example, a method of processing feature set data formed from media data, the method comprising: receiving, by a first network entity, a compressed feature map including features extracted from media data and processed according to a first part of a computing graph and additional data from a second network entity, the additional data corresponding to at least a portion of the media data that was buffered by the second network entity; decompressing, by the first network entity, the compressed feature map; and performing, by the first network entity, a second part of the computing graph on the feature map using the additional data, the second part of the computing graph corresponding to processing tasks to be performed by the first network entity.

In another example, a device for processing feature set data formed from media data includes: a memory configured to store feature set data and media data; and a processing system comprising one or more processors implemented in circuitry, the processing system being configured to: receive a compressed feature map including features extracted from media data and processed according to a first part of a computing graph and additional data from a second network entity, the additional data corresponding to at least a portion of the media data that was buffered by the second network entity; decompress the compressed feature map; and perform a second part of the computing graph on the feature map using the additional data, the second part of the computing graph corresponding to processing tasks to be performed by the first network entity.

The details of one or more examples are set forth in the accompanying drawings and the description below. Other features, objects, and advantages will be apparent from the description and drawings, and from the claims.

DETAILED DESCRIPTION

Figure 1:
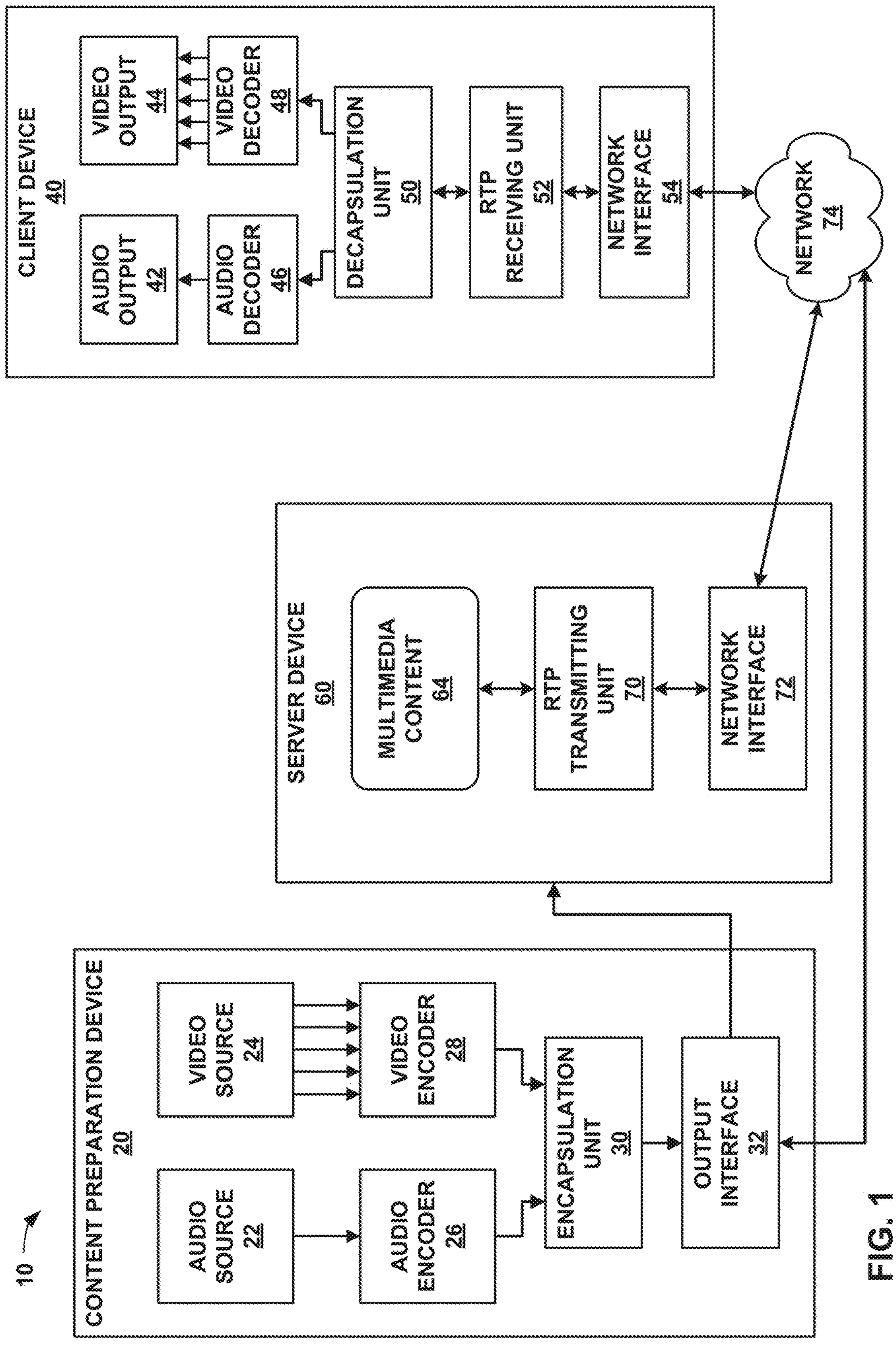
FIG. 1 is a block diagram illustrating an example system that implements techniques for streaming media data over a network.

In general, this disclosure is directed to techniques related to video coding for machines (VCM). VCM may be used when processing image or video data that is not necessarily to be used by human users, e.g., for video playback. For example, the video data may instead be processed for machine-based operational tasks, such as security monitoring, object detection/tracking, instance segmentation, navigation for automated devices, machine vision, hybrid vision, or the like. In general, such processes may be performed using a task network, e.g., using one or more artificial intelligence/machine learning (AI/ML) models. The task network may correspond to a computing graph, including nodes representing various processing tasks to fulfill the task network.

The processing tasks of a task network may be split at a split point, such that a first set of processing tasks of the task network (that is, a first part of a computing graph representing the task network) is performed by a first network entity (e.g., a source device), and a second set of processing tasks of the task network is performed by a second network entity (e.g., a destination device). The source device may include a camera for capturing image or video data and a processing system configured to perform the first set of processing tasks. The source device may be, for example, a user equipment (UE) device. The source device may capture image or video data and perform the first set of processing tasks on the image or video data to extract a feature set, then compress the feature set and send the compressed feature set to the destination device. The destination device may then decompress the feature set and perform the second set of processing tasks.

The first network entity may determine the split point, separating the processing tasks into the first set of processing tasks and the second set of processing tasks, according to various operating conditions. For example, such conditions may include operations supported by the first network entity and the second network entity, bandwidth conditions of a network connection between the first network entity and the second network entity, a battery charge level of the source device/first network device, or the like. The first network entity may further determine coding configuration information to be applied when encoding the feature map, e.g., based on the bandwidth conditions and other operating conditions. In this manner, the processing tasks may be efficiently distributed, while also reducing bandwidth consumption when available bandwidth has been reduced, thereby improving performance of the overall image processing system.

In some cases, the destination device may perform the second set of processing tasks and determine that the results have a low confidence value. This may occur because, for example, the feature map as extracted from the media data during the first set of processing tasks may not include sufficient information, the decompressed feature map may have lost too much information during compression and decompression, or the like. Therefore, in some cases, the original media data (or some version thereof) may be needed to improve the confidence value of the second set of processing tasks. Per the techniques of this disclosure, the source device may buffer the media data (video or image data) used to form the feature map, and the destination device may request the buffered media data. The destination device may then receive the buffered media data from the source device and use the media data to perform the second set of processing tasks.

Additionally or alternatively, the source device may buffer feature sets extracted from the media data. In some cases, loss introduced by compression may lead to low confidence values for object detection as performed by the destination device. Furthermore, the media data may include identifying representations of people or objects that a user may wish to obscure (e.g., for privacy). Therefore, rather than requesting the media data directly, the destination device may request the buffered feature sets (or some portion of data thereof).

In still other examples, both media data and the feature sets may be buffered at the source device and either or both may be requested by the destination device.

In this manner, the destination device may request the media data or buffered feature sets only when needed, rather than streaming the media data and/or buffered feature sets from the source device to the destination device on an ongoing basis. Thus, these techniques may therefore reduce network bandwidth consumed by sending the media data or buffered feature sets (because the media data/uncompressed or reduced-compression feature sets need only be sent on an as-needed basis), while also maintaining high confidence values for the overall set of processing tasks (the full computing graph) performed jointly by the source and destination devices, because the destination device can use the buffered media data and/or feature sets as needed.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a media presentation. For example, the coded video or audio part of the media presentation can be an elementary stream. An elementary stream may be converted into a packetized elementary stream (PES) before being encapsulated within a video file. Within the same media presentation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into streamable media data.

Encapsulation unit 30 receives PES packets for elementary streams of a media presentation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Server device 60 includes Real-time Transport Protocol (RTP) transmitting unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64 and include components that conform substantially to those of server device 60. In general, network interface 72 is configured to send and receive data via network 74.

RTP transmitting unit 70 is configured to deliver media data to client device 40 via network 74 according to RTP, which is standardized in Request for Comment (RFC) 3550 by the Internet Engineering Task Force (IETF). RTP transmitting unit 70 may also implement protocols related to RTP, such as RTP Control Protocol (RTCP), Real-time Streaming Protocol (RTSP), Session Initiation Protocol (SIP), and/or Session Description Protocol (SDP). RTP transmitting unit 70 may send media data via network interface 72, which may implement Uniform Datagram Protocol (UDP) and/or Internet protocol (IP). Thus, in some examples, server device 60 may send media data via RTP and RTSP over UDP using network 74.

RTP transmitting unit 70 may receive an RTSP describe request from, e.g., client device 40. The RTSP describe request may include data indicating what types of data are supported by client device 40. RTP transmitting unit 70 may respond to client device 40 with data indicating media streams, such as media content 64, that can be sent to client device 40, along with a corresponding network location identifier, such as a uniform resource locator (URL) or uniform resource name (URN).

RTP transmitting unit 70 may then receive an RTSP setup request from client device 40. The RTSP setup request may generally indicate how a media stream is to be transported. The RTSP setup request may contain the network location identifier for the requested media data (e.g., media content 64) and a transport specifier, such as local ports for receiving RTP data and control data (e.g., RTCP data) on client device 40. RTP transmitting unit 70 may reply to the RTSP setup request with a confirmation and data representing ports of server device 60 by which the RTP data and control data will be sent. RTP transmitting unit 70 may then receive an RTSP play request, to cause the media stream to be "played," i.e., sent to client device 40 via network 74. RTP transmitting unit 70 may also receive an RTSP teardown request to end the streaming session, in response to which, RTP transmitting unit 70 may stop sending media data to client device 40 for the corresponding session.

RTP receiving unit 52, likewise, may initiate a media stream by initially sending an RTSP describe request to server device 60. The RTSP describe request may indicate types of data supported by client device 40. RTP receiving unit 52 may then receive a reply from server device 60 specifying available media streams, such as media content 64, that can be sent to client device 40, along with a corresponding network location identifier, such as a uniform resource locator (URL) or uniform resource name (URN).

RTP receiving unit 52 may then generate an RTSP setup request and send the RTSP setup request to server device 60. As noted above, the RTSP setup request may contain the network location identifier for the requested media data (e.g., media content 64) and a transport specifier, such as local ports for receiving RTP data and control data (e.g., RTCP data) on client device 40. In response, RTP receiving unit 52 may receive a confirmation from server device 60, including ports of server device 60 that server device 60 will use to send media data and control data.

After establishing a media streaming session between server device 60 and client device 40, RTP transmitting unit 70 of server device 60 may send media data (e.g., packets of media data) to client device 40 according to the media streaming session. Server device 60 and client device 40 may exchange control data (e.g., RTCP data) indicating, for example, reception statistics by client device 40, such that server device 60 can perform congestion control or otherwise diagnose and address transmission faults.

Network interface 54 may receive and provide media of a selected media presentation to RTP receiving unit 52, which may in turn provide the media data to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, RTP receiving unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, RTP receiving unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via RTP receiving unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
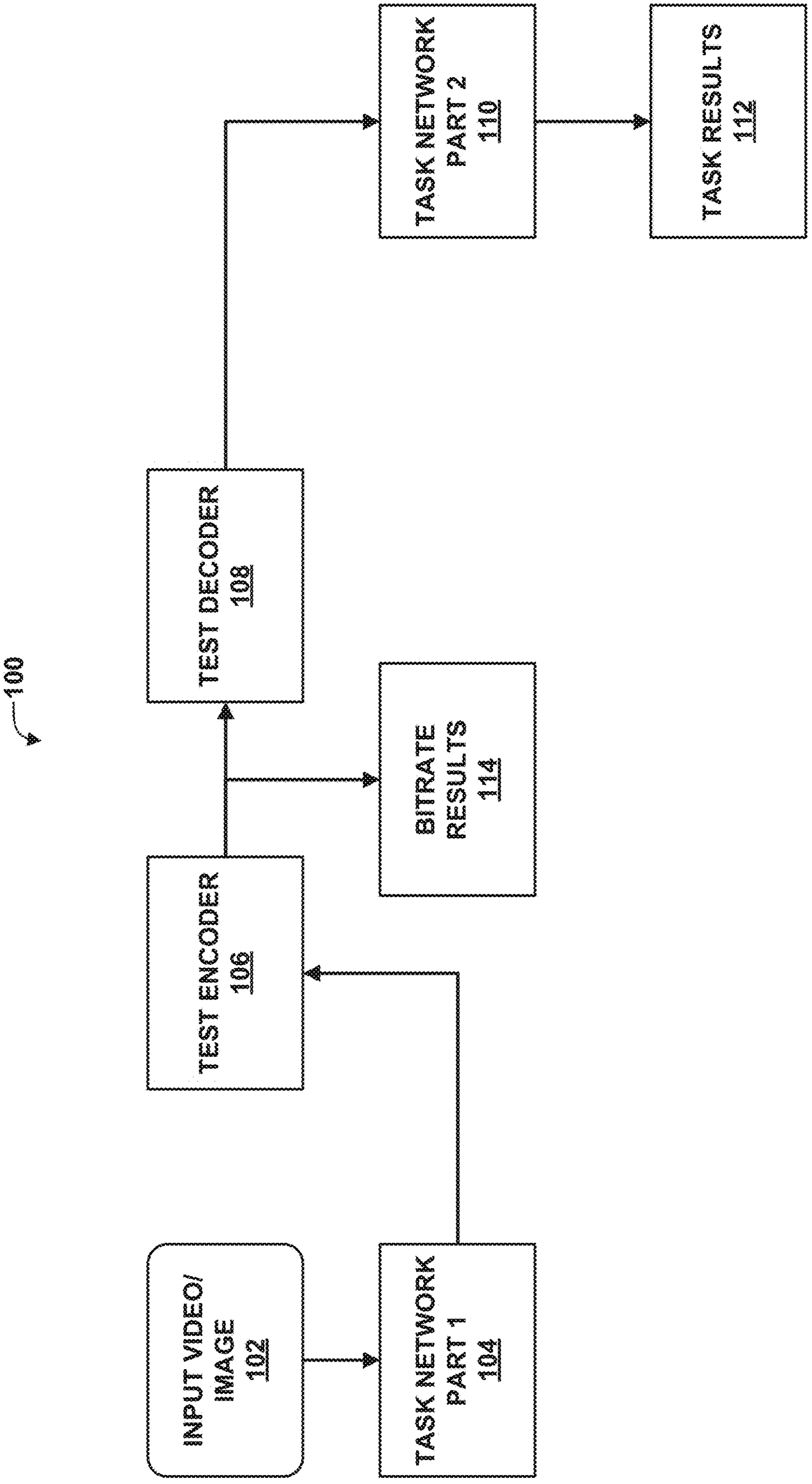
FIG. 2 is a conceptual diagram illustrating an example system that may perform the techniques of this disclosure.

FIG. 2 is a conceptual diagram illustrating an example system 100 that may perform the techniques of this disclosure. In particular, these techniques may include feature compression for video coding for machines (FC-VCM), e.g., according to "Updates on Video Coding for Machines," WG 2, MPEG Technical Requirements, July 2022, available at www.mpeg.org/wp-content/uploads/mpeg_meetings/139_OnLine/w21826.zip. As shown in FIG. 2, system 100 includes task network part 1 104, an encoder 106, a decoder 108, and task network part 2 110. Together, task networks parts 1 (104) and 2 (110) form a complete task network, e.g., a neural network for instance segmentation, object tracking, object detection, or the like.

Task network part 1 104 extracts a feature set from original image or video data 102 and provides an intermediate feature set (also referred to as a "feature map," e.g., the output of an intermediate stage of a computing graph (e.g., a neural network, a transformer, a R-CNN FPN)) to encoder 106, which encodes the feature data and sends the encoded feature data to decoder 108. Decoder 108 decodes the feature data and provides the decoded feature data to task network part 2 110. Task network part 2 completes processing of the feature data to determine task results 112. In the example of FIG. 2, system 100 also includes bitrate results 114, representing data determined according to evaluation of a bitstream including the encoded feature data.

In general, VCM is intended for consumption by a machine executing an algorithm, rather than a human being. The task network formed by task networks part 1 and 2 of FIG. 2 may be for various tasks (e.g., implemented algorithms), such as object tracking or instance segmentation. If the task network is split properly, FC-VCM can reduce required bandwidth (bit rate) for a communication system.

To perform VCM, task network part 1 104 may extract video features from original image/video data 102. After performing one or more processing tasks on the extracted features, encoder 106 may encode the current features and transmit the encoded features via a communication network. Compression may lead to performance loss in the task network, compared to the case where a first network entity (such as a UE) transmits the image or video through the communication network to a second network entity (e.g., an application server) that performs the entirety of the task network.

If the portion of the task network in the second network entity (including task network part 2 110) detects an object or has low confidence on the inference result (as part of task results 112), the second network entity can request that the first network entity send the image or video for higher accuracy. For certain task networks, such as those for surveillance, there may be a long period of time before an object is detected. This request approach can keep the data rate low in the long term while improving the performance of the task network.

According to the techniques of this disclosure, a first network entity, such as a user equipment (UE), may include components for performing task network part 1 104 and encoder 106 for encoding (compressing) an intermediate feature set (or "intermediate feature map") generated by task network part 1. The first network entity may send the encoded/compressed intermediate feature set to a second network entity, such as an application server, that includes decoder 108 and components for task network part 2 110. The first network entity may perform task network part 1 (e.g., an inference task network) and send compressed features to the second network entity and may buffer past images or videos. The buffered images or video frames may be identified by, e.g., sequence numbers or timestamps. The buffered images or video frames may be compressed to reduce storage. The amount of buffered data may be measured according to the number of images or video frames, or the amount of time represented by the images or video frames.

The second network entity may request that the first network entity send additional data for additional inference. The additional data may include, for example, buffered images or video frames (which may be compressed), compressed features corresponding to some of the images or video frames at the same split point with less compression (which may improve inference performance) or enhancement data of the features (e.g., information lost in the initial compression), and/or compressed features corresponding to some images or video frames at a different split point, e.g., a split point that results in improved inference performance relative to the initial split point.

The second network entity may construct the request to identify the buffered media data (e.g., images or video frames), e.g., using sequence numbers, frame numbers, picture order count (POC) values, or a playback time interval. The second network entity may additionally or alternatively specify, in the request, a target compression ratio and/or a target bit rate for the requested data. The second network entity may send the request in response to any or all of: detection of an object by task network part 2, confidence of an inference result (e.g., measured against a threshold) from task network part 2, estimated communication network quality, predicted communication network quality, computing capability of the first network entity, and/or latency requirements of task network part 2 (e.g., for object detection). The second network entity may specify the cause and priority of the request to the first network entity, which may then prioritize the transmission of the requested additional data. For example, if the cause is the detection of a particular object, it may be urgent for the second network entity to receive the additional data to verify the detection or to reduce false alarm occurrences.

The first network entity may send the requested additional data to the second network entity. The first network entity may send the additional data from the buffer directly or may generate the additional data (e.g., by processing the buffered data differently or additionally) in response to the request. The first network entity may compress the additional data, e.g., according to the requested compression rate or target bit rate, which may be different than the degree of compression applied to the initial feature map.

The second network entity may then perform additional inference processing using the received additional data. For example, the second network entity may execute the same task network (task network part 2) using the additional data. As another example, the second network entity may execute a different task network using the additional data, e.g., at a different split point, using additional or fewer tasks, or the like.

The second network entity may also request that the first network entity adjust (e.g., increase or decrease) an amount of buffered media data, based on needs for performing additional inference processing. The amount of buffer may be modified in terms on a new number of images or amount of video frames or features to be buffered, and/or the time period to be covered by the buffered images, video frames, or features. Thus, the first network device may adjust the amount of buffered media data in response to this request.

The overall computing graph may initially be trained using system 100, in that bitrate results 114 may be analyzed to determine a bitrate reduction resulting from encoding/compression performed by test encoder 106. Test decoder 108 may decode the intermediate feature set, task network part 2 may perform the second set of processing tasks, and task results 112 may be compared to objective data for input video/image data 102 to determine confidence values to train the overall network. Once training has been completed, a deployed system similar to system 100 may be used, although in such a deployed system, bitrate results 114 need not necessarily be generated, and test encoder 106 and test decoder 108 may be replaced with actual encoders and decoders, e.g., as discussed in greater detail below with respect to FIGS. 6, 8, and 10.

Figure 3:
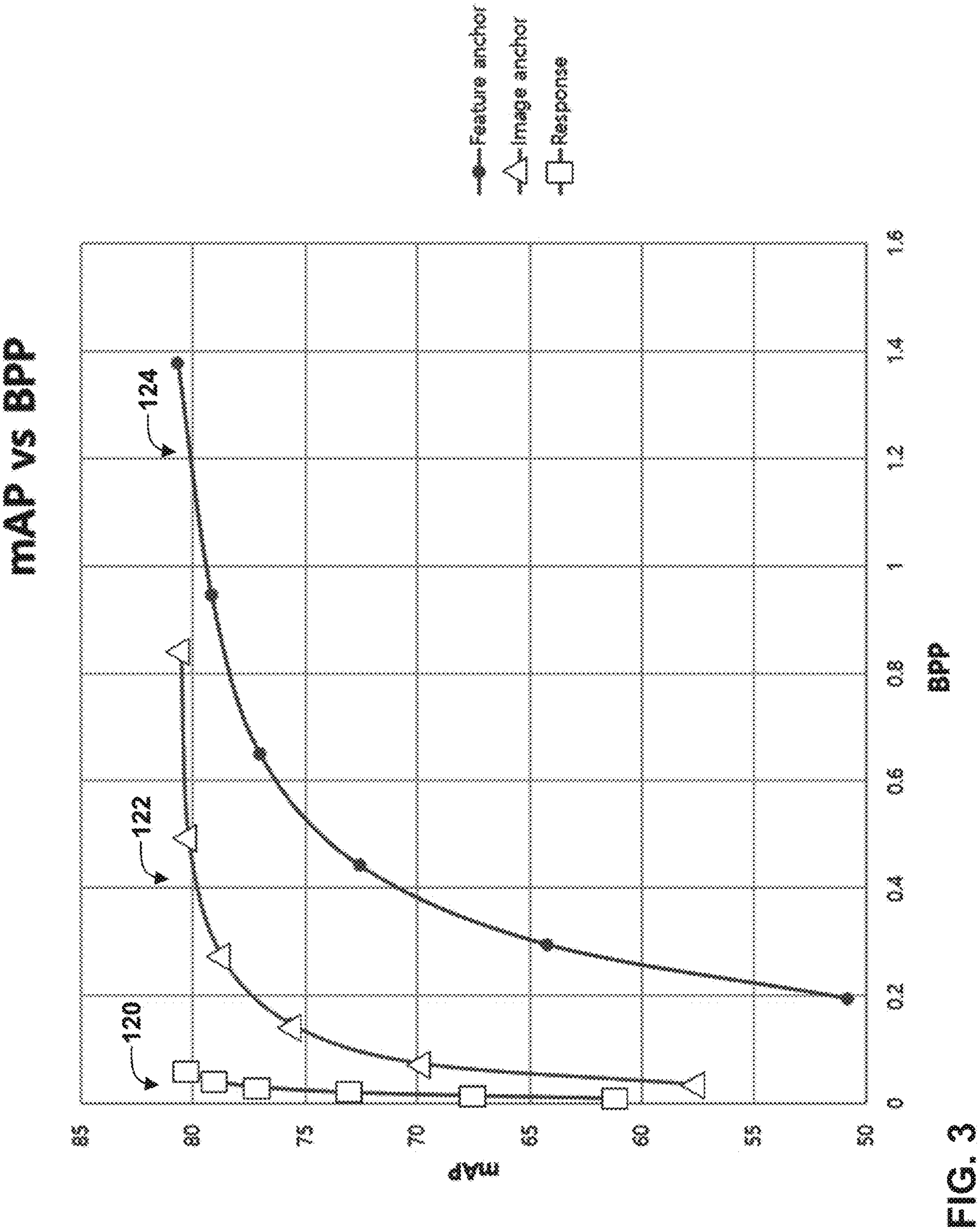
FIG. 3 is a graph depicting performance results of feature compression for video coding for machines.

FIG. 3 is a graph depicting performance results of feature compression for video coding for machines. The performance of the task network may depend on bit rate. In the graph of FIG. 3, mean average precision (MAP) is compared against bit rate per pixel (BPP) for instance segmentation tasks. As shown, FC-VCM curve 120 indicates that FC-VCM offers significant performance gain over, e.g., feature anchor performance indicated by feature anchor curve 124 and image anchor techniques indicated by image anchor curve 122. FV-VCM also offers privacy and compute off-loading, because a person or other entity cannot detect identifying characteristics from a feature map.

In general, the bitstream bit rate should match the capacity of the communication network. The capacity of the communication network available to an encoder may change over time, e.g., due to user mobility and network load. A realistic communication network should be considered. Factors affecting the feature bitrate may include the split of and selection of inner structures of the task network, quantization of the features, and/or compression of the features. This disclosure describes techniques related to signaling aspects between the two end points for FC-VCM that may enable dynamic splits and/or inner structure selection of a computing graph in response to bitrate adaptation for FC-VCM. This may include representation and/or negotiation.

Figure 4:
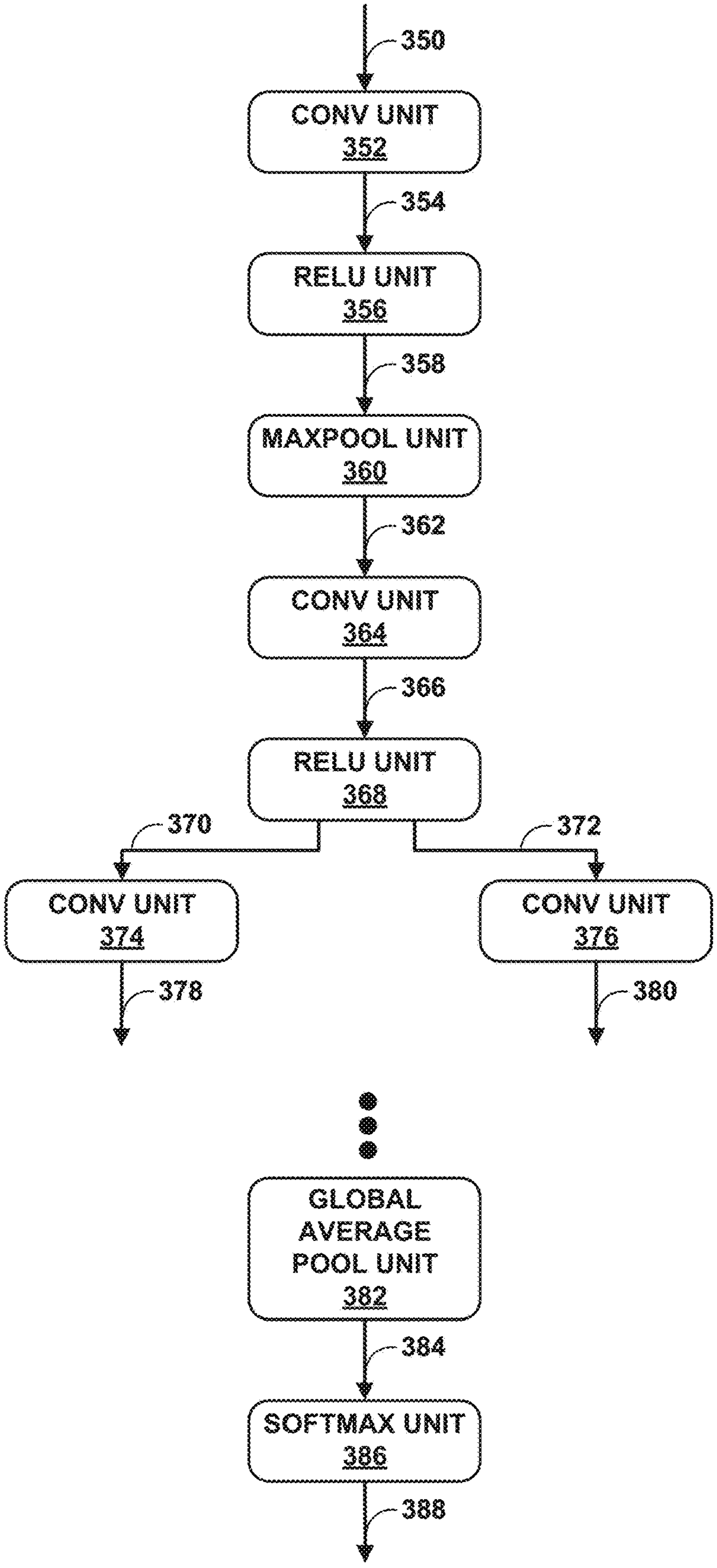
FIG. 4 is a graph illustrating an example computing graph according to techniques of this disclosure.

FIG. 4 is a graph illustrating an example computing graph 130 according to techniques of this disclosure. In some examples, various split points and potential droppable inner structures may be determined. The example of FIG. 4 depicts inner structures including convolution (conv) unit 352, ReLU unit 354, MaxPool unit 360, convolution unit 364, ReLU unit 368, convolution unit 374, convolution unit 376, global average pool unit 382, and SoftMax unit 386.

In this example, convolution unit 352 receives data_0 350. Convolution unit 352 may have a W of <64×3×3×3> and a B of <64>. Convolution unit 352 may output conv1_1 354, and ReLU unit 356 may process conv1_1 354 to form conv1_2 358. MaxPool unit 360 may process conv1_2 358 to form pool1_1 362. Convolution unit 364 may have a W of <16×64×1×1> and a B of <16>. Convolution unit 364 may process pool1_1 362 to form fire2/squeeze1×1_1 366.

ReLU unit 368 may process fire2/squeeze1×1_1 366 to form either or both of fire2/squeeze1×1_2 370 and/or fire2/squeeze1×1_2 372. Convolution unit 374 may have a W of <64×16×1×1> and a B of <64> and may process fire2/squeeze1×1_2 370 to form fire2/expand1×1_1 378. Convolution unit 376 may have a W of <64×16×3×3> and a B of <64> and may process fire2/squeeze1×1_2 372 to form fire2/expand3×3_1 380. Additional units not shown in FIG. 4 may form part of the task network. Ultimately, global average pool unit 382 may receive the processed data and form pool10_1 384. SoftMax unit 386 may process pool10_1 384 to form softamxout_1 388.

A task network repository may include data representing various identifiers of potential split points and/or potential droppable inner structures of a computing graph, such as that shown in FIG. 4. The computing graph may be, for example, MLP, CNN, LSTM, GRU, transformer, or the like. The task network repository may send this data to the two entities involved in splitting the task network, e.g., a user equipment (UE) and an application server (AS). The AS may perform the task network part 1 and encoder-side functionality, while the UE may perform the decoder and task network part 2 functionality, for example.

A split point may be the output of a computing node in the computing graph. For example, the split point may be the output of a MAX POOL2 layer of an AlexNet. In the example of FIG. 4, any of data_0 350, conv1_1 354, conv1_2 358, pool1_1 362, fire2/squeeze1×1_1 366, fire2/squeeze1×1_2 370, fire2/squeeze1×1_2 372, fire2/expand1×1_1 378, fire2/expand3×3_1 380, pool10_1 384, or softmaxout_1 388 may correspond to the split point between task network part 1 and task network part 2.

An inner structure to drop may be a computing node or the output of a computing node. For example, P2 in a base R-convolutional neural network (CNN) FPN network may be dropped.

Identifiers for split points and/or droppable inner structures may be labels generated by applying a computing graph description tool to the computing graph, which may also be signaled. For example, the circled labels in FIG. 4 represent examples of such identifiers. The identifiers may be encoded labels (to reduce size/bitrate). For example, encoding may output 8 bits if there are 256 possible combined potential split points and potential inner structures that can be dropped. Two sets of identifiers may be used: one for potential split points and another for potential inner structures to drop. The network repository may be collocated with an entity, e.g., the application server.

The task network repository may also send the computing graph description tool or an indication of the computing graph description tool. Examples of computing graph description tools include Open Neural Network Exchange (ONNX) and Neural Network Exchange Format (NNEF). In some examples, the task network repository may alternatively send a URI, URL, or URN that defines and labels the split points or inner structures to drop.

Figure 5:
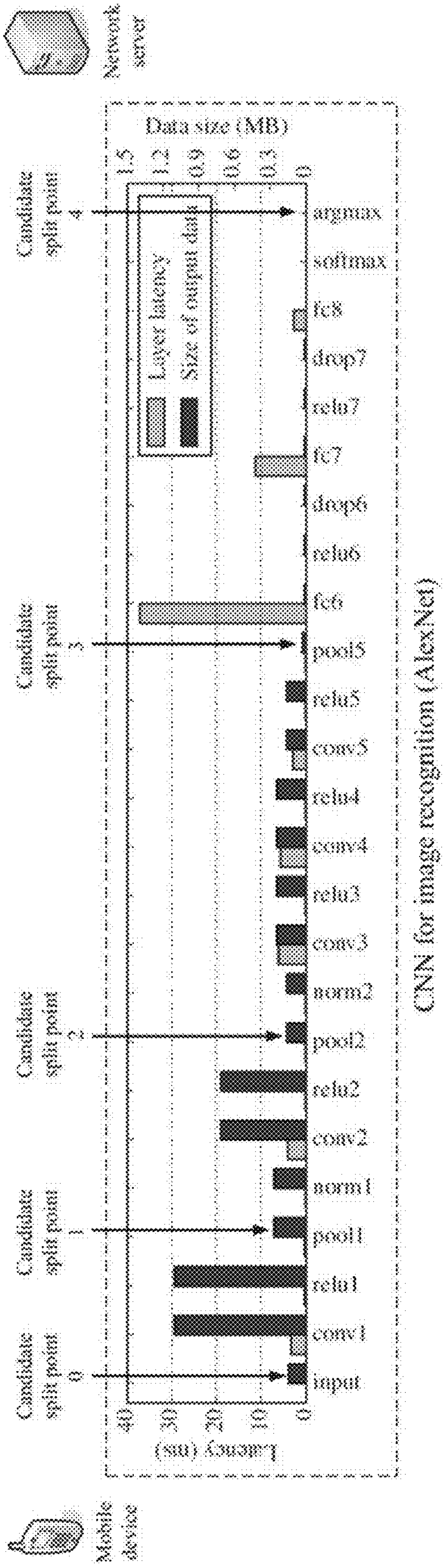
FIG. 5 is a conceptual diagram illustrating a bar graph depicting a size of output data compared to an amount of latency for various split points of a convolutional neural network (CNN) for image recognition.

FIG. 5 is a conceptual diagram illustrating a bar graph 140 depicting a size of output data compared to an amount of latency for various split points of a convolutional neural network (CNN) for image recognition.

Figure 6:
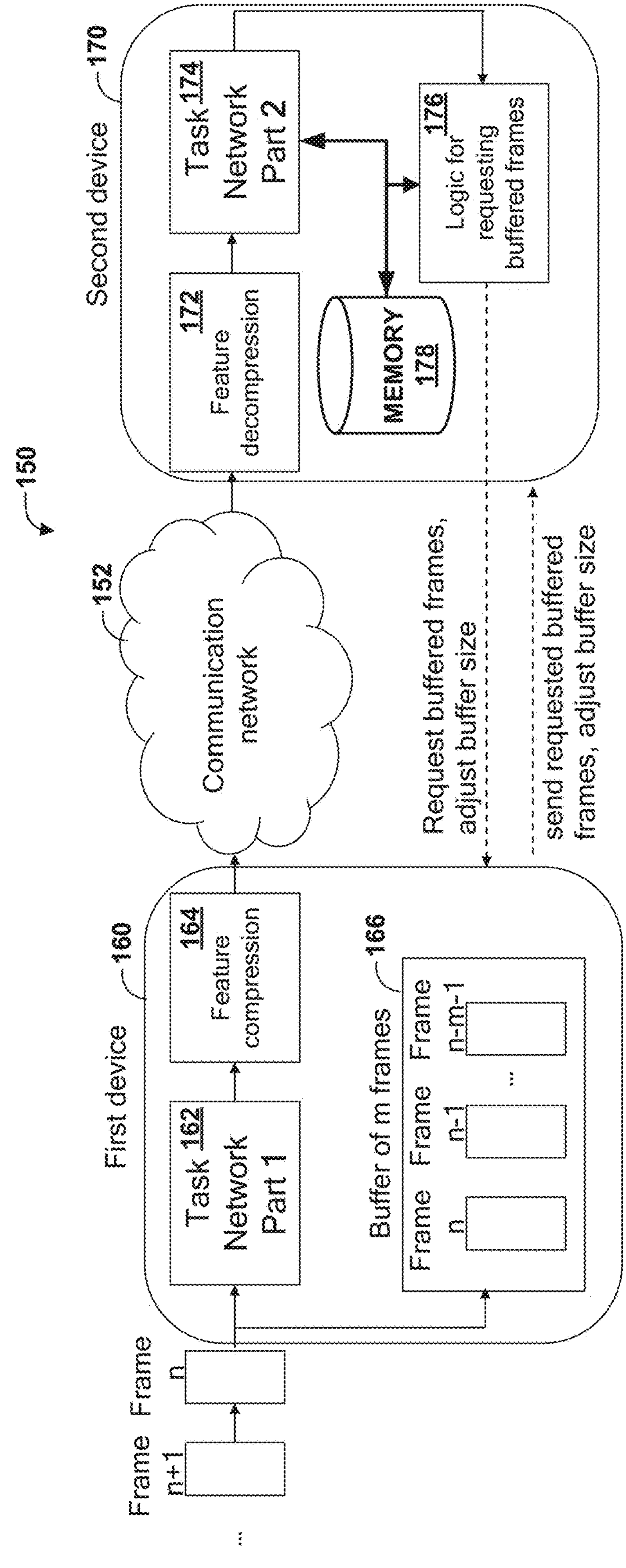
FIG. 6 is a block diagram illustrating an example system architecture for performing techniques of this disclosure.

FIG. 6 is a block diagram illustrating an example system architecture 150 for performing techniques of this disclosure. According to the example of FIG. 6, a first network entity (first device 160) may send additional data in the form of buffered images or video frames (which may be compressed) to a second network entity (second device 170), e.g., in response to a request for the buffered images or video frames from second device 170. As shown in the example of FIG. 6, first device 160 (a first network entity) includes task network part 1 162, feature compression unit 164, and buffer 166 to store m frames of media data. Task network part 1 162 and feature compression unit 164 may be implemented in hardware, software, firmware, or any combination thereof (and when implemented in software or firmware, requisite processing circuitry and storage media for storing instructions to be executed may be provided).

Buffer 166 may refer to any storage media (one or more storage devices) that can store image or video data until later requested (or discarded). Buffer 166 may be configured to operate as a first-in, first-out (FIFO) buffer, such that once buffer 166 is full, if a new frame is received, an oldest-received frame still in the buffer may be discarded to allow for storage of the new frame.

Second device 170 (a second network entity) includes feature decompression unit 172, task network part 2 174, logic for requesting buffered frames 176, and memory 178. Task network part 2 174, feature decompression unit 172, and logic for requesting buffered frames 176 may be implemented in hardware, software, firmware, or any combination thereof (and when implemented in software or firmware, requisite processing circuitry and storage media for storing instructions to be executed may be provided). Memory 178 may refer to any storage media (one or more storage devices) for storing feature set/map data and media data. Logic for requesting buffered frames 176 may request buffered frames from first device 160 and store the received frames to memory 178. Feature decompression unit 172 may also store decompressed feature sets to memory 178, and task network part 2 174 may retrieve the decompressed feature sets and/or media data from memory 178 when performing the second set of processing tasks of the computing graph.

First device 160 and second device 170 communicate via communication network 152.

As discussed above, logic for requesting buffered frames 176 of second device 170 may request additional data based on, e.g., one or more of detection of an object, confidence of an inference result, estimated quality of the depicted communication network, predicted quality of the communication network, computing capability of the first device, and/or a latency requirement of a particular feature processing task. In this example, the additional data includes the images or frames buffered in buffer 166 of first device 160 themselves, e.g., one or more of frames n, n−1, . . . n−m−1. That is, logic for requesting the buffered frames 176 (which may be implemented in hardware, software, firmware, or a combination thereof) may request one or more of the buffered frames and/or request that the size of buffer 166 be adjusted. In response, first device 160 may send the requested buffered frames and/or adjust the size of buffer 166, e.g., to store more or fewer than m frames/images.

In this manner, first device 160 represents an example of a device for processing feature set data formed from media data, including: a memory configured to store feature set data and media data; and a processing system comprising one or more processors implemented in circuitry, the processing system being configured to: perform a first part of a computing graph on a set of the media data to form a feature map, the first part of the computing graph representing first processing tasks performed by the device, the device comprising a first network entity, wherein a second part of the computing graph corresponds to second processing tasks to be performed by a second network entity; buffer at least a portion of the media data in the memory; compress the feature map to form a compressed feature map; and send the compressed feature map and additional data corresponding to the buffered at least portion of the media data to the second network entity to enable the second network entity to perform the second part of the computing graph using the feature map and the additional data.

Likewise, second device 170 represents an example of a device for processing feature set data formed from media data, including: a memory configured to store feature set data and media data; and a processing system comprising one or more processors implemented in circuitry, the processing system being configured to: receive a compressed feature map including features extracted from media data and processed according to a first part of a computing graph and additional data from a second network entity, the additional data corresponding to at least a portion of the media data that was buffered by the second network entity; decompress the compressed feature map; and perform a second part of the computing graph on the feature map using the additional data, the second part of the computing graph corresponding to processing tasks to be performed by the first network entity.

Figure 7:
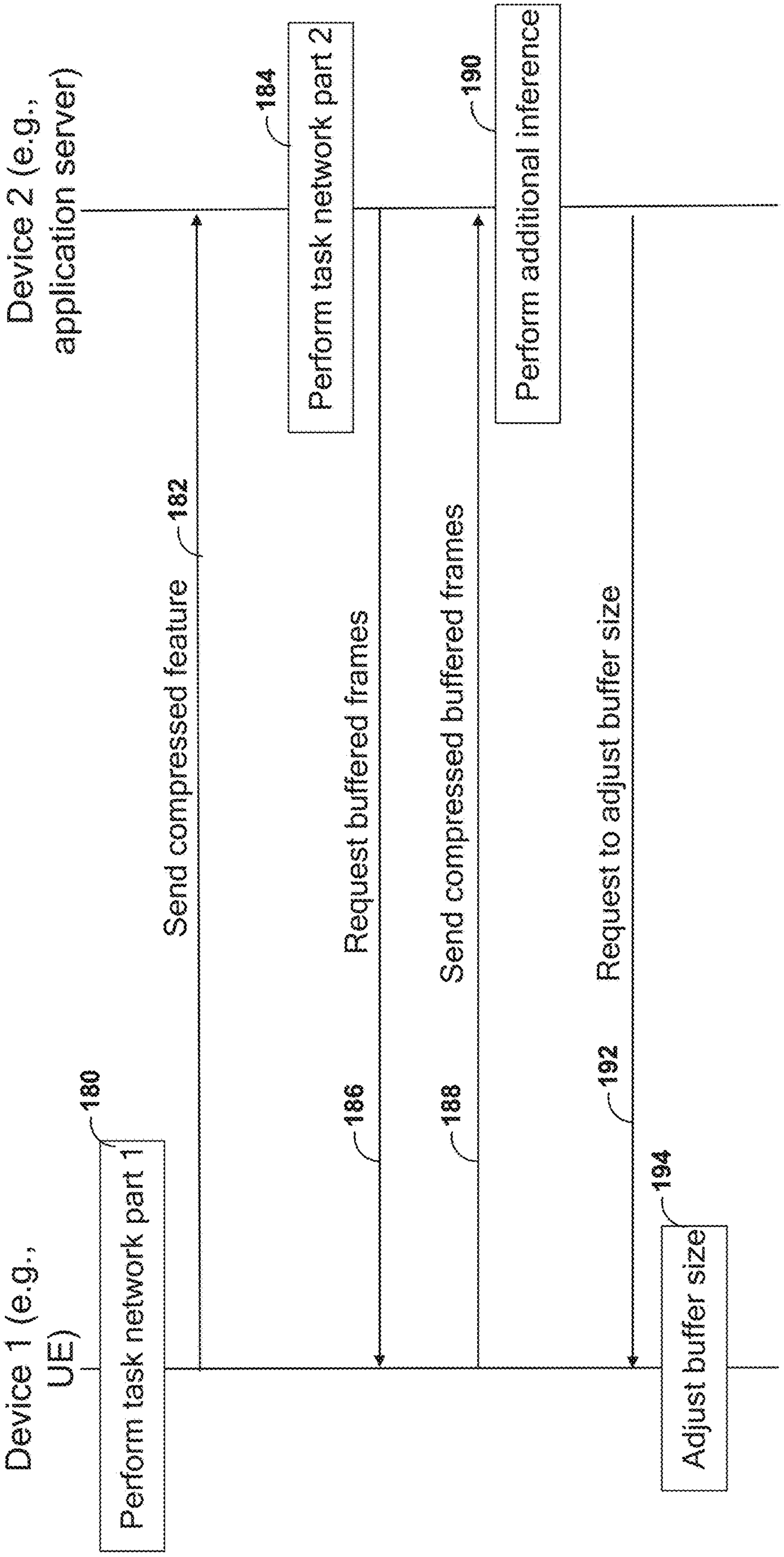
FIG. 7 is a call flow diagram illustrating an example method that may be performed by the system architecture of FIG. 6 according to techniques of this disclosure.

FIG. 7 is a call flow diagram illustrating an example method that may be performed by the system architecture of FIG. 6 according to techniques of this disclosure. The method of FIG. 7 may be performed by first device 160 and second device 170 of FIG. 6.

Initially, first device 160 (e.g., a UE) may perform task network part 1 (180). That is, first device 160 may extract a feature set from one or more images of media data through performing a first part of a computing graph (a first set of processing tasks of a task network). Task network part 1 162 may process the images of media data according to the first portion of the task network to form an intermediate feature set. Feature compression unit 164 may encode (compress) the intermediate feature set, and first device 160 may then send the compressed feature set to second device 170 (182). In addition, first device 160 may buffer the images of media data in buffer 166. The buffered images may span at least a round-trip time (RTT) between first device 160 and second device 170 and the computing time of task network part 2 174. In some examples, the RTT and the computing time may be the minimum amount of time to elapse before first device 160 receives a request from second device 170.

Feature decompression unit 172 of second device 170 may decode (decompress) the intermediate feature set. Then, task network part 2 174 may perform task network part 2 (184). Based on analysis of the task results, second device 170 may request buffered frames from first device 160 (186). For example, second device 170 may detect a particular object from the feature set, or determine that an object is present but be unable to identify the object with a high confidence value. In response to the request, first device 160 may send one or more pictures or frames of video data from buffer 166 to second device 170, according to the request (188).

Second device 170 may use the additional data (the one or more pictures or frames of video data from buffer 166, in this example) to perform additional inference processing (190), e.g., to attempt to identify the object in the feature set with a higher confidence value using the retrieved media data and the feature set. In this example, second device 170 also requests that first device 160 adjust the size of buffer 166 (192). Furthermore, in some examples (such as if there were not enough buffered images, or the number of buffered images exceeded that needed to increase the confidence value), second device 170, e.g., to increase or decrease the buffer size based on results of the additional inference processing. In response, first device 160 may adjust the size of buffer 166 according to the request form second device 170 (194).

In this manner, the method of FIG. 7 represents an example of a method of processing feature set data formed from media data, including: performing, by a first network entity (e.g., first device 160 of FIG. 6), a first part of a computing graph on a set of media data to form a feature map, the first part of the computing graph representing first processing tasks performed by the first network entity, wherein a second part of the computing graph corresponds to second processing tasks to be performed by a second network entity; buffering, by the first network entity, at least a portion of the media data; compressing, by the first network entity, the feature map to form a compressed feature map; and sending, by the first entity, the compressed feature map and additional data corresponding to the buffered at least portion of the media data to the second network entity to enable the second network entity to perform the second part of the computing graph using the feature map and the additional data.

The method of FIG. 7 also represents an example of a method of processing feature set data formed from media data, including: receiving, by a first network entity (e.g., second device 170 of FIG. 6), a compressed feature map including features extracted from media data and processed according to a first part of a computing graph and additional data from a second network entity, the additional data corresponding to at least a portion of the media data that was buffered by the second network entity; decompressing, by the first network entity, the compressed feature map; and performing, by the first network entity, a second part of the computing graph on the feature map using the additional data, the second part of the computing graph corresponding to processing tasks to be performed by the first network entity.

Figure 8:
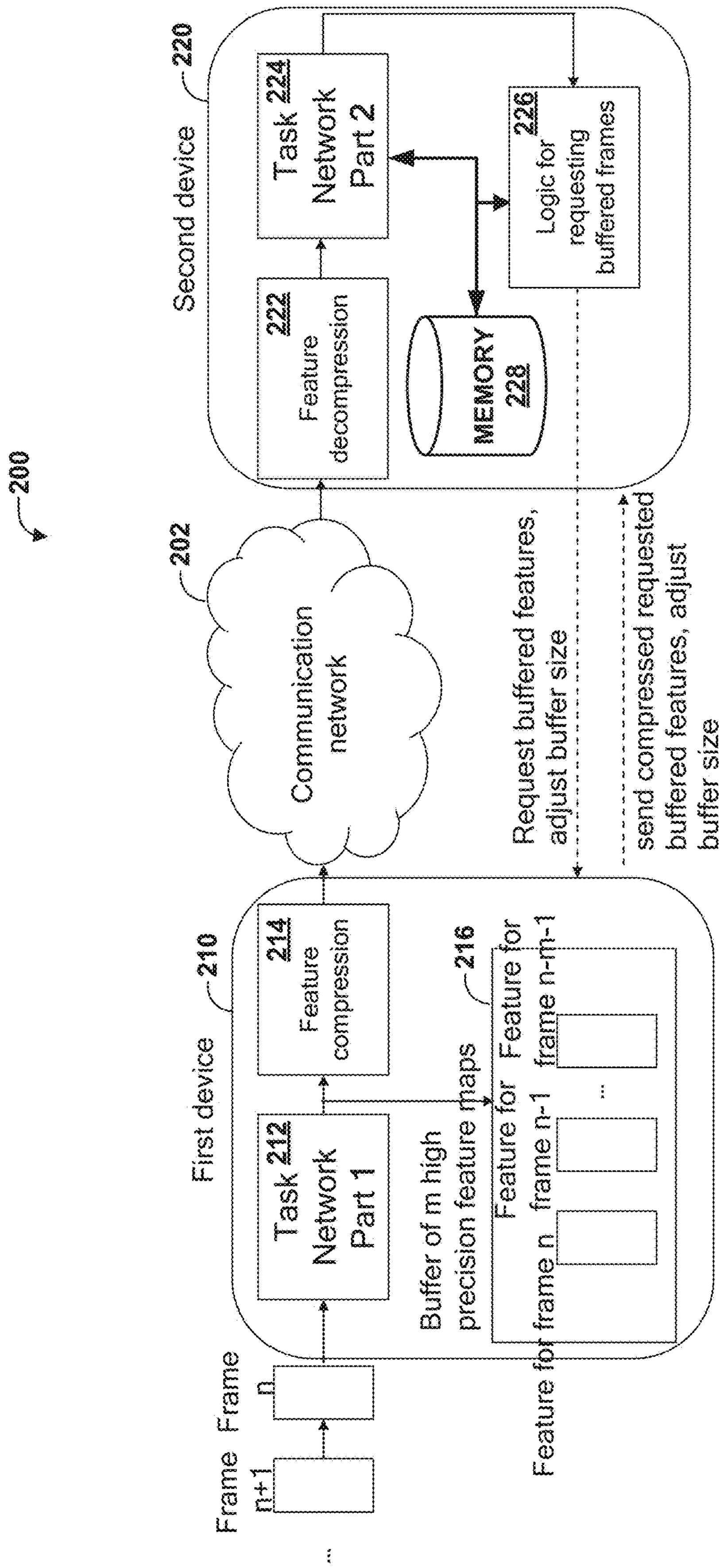
FIG. 8 is a block diagram illustrating another example system architecture for performing techniques of this disclosure.

FIG. 8 is a block diagram illustrating another example system architecture 200 for performing techniques of this disclosure. According to the example of FIG. 8, a first network entity (first device 210) may send additional data in the form of compressed features buffered in buffer 216 that were processed by the same task network portion (i.e., up to the same split point) but with less compression. Additionally or alternatively, the additional data may be enhancement data of the features, e.g., information that was lost due to the initial compression.

As shown in the example of FIG. 8, first device 210 (a first network entity) includes task network part 1 212, a feature compression unit 214, and a buffer 216 to store feature sets for frames n, n−1, . . . n−m−1. Task network part 1 212 and feature compression unit 214 may be implemented in hardware, software, firmware, or any combination thereof (and when implemented in software or firmware, requisite processing circuitry and storage media for storing instructions to be executed may be provided).

Buffer 216 may refer to any storage media (one or more storage devices) that can store image or video data until later requested (or discarded). Buffer 216 may be configured to operate as a first-in, first-out (FIFO) buffer, such that once buffer 216 is full, if a new set of features for a frame is received, an oldest-received set of features still in the buffer may be discarded to allow for storage of the new set of features.

Second device 220 (second network entity) includes feature decompression unit 222, task network part 2 224, logic for requesting buffered features 226, and memory 228. Task network part 2 224, feature decompression unit 222, and logic for requesting buffered features 226 may be implemented in hardware, software, firmware, or any combination thereof (and when implemented in software or firmware, requisite processing circuitry and storage media for storing instructions to be executed may be provided). Memory 228 may refer to any storage media (one or more storage devices) for storing feature set/map data. Logic for requesting buffered features 226 may request buffered features from first device 210 and store the received feature sets to memory 228. Feature decompression unit 222 may also store decompressed feature sets to memory 228, and task network part 2 224 may retrieve the decompressed feature sets and/or retrieved feature sets from memory 228 when performing the second set of processing tasks of the computing graph.

First device 210 and second device 220 communicate via communication network 202, which may represent the Internet.

As discussed above, logic for requesting buffered features 226 of second device 220 may request additional data based on, e.g., one or more of detection of an object, confidence of an inference result, estimated quality of the depicted communication network, predicted quality of the communication network, computing capability of the first device, and/or a latency requirement of a particular feature processing task. In this example, the additional data includes features for the previously processed images or frames, where the features may be buffered in buffer 216 of first device 210, e.g., features for one or more of frames n, n−1, . . . n−m−1. The features of the additional data may be less compressed than the intermediate feature set initially sent to second device 220. The logic for requesting the buffered features 226 (which may be implemented in hardware, software, firmware, or a combination thereof) may request features for one or more of the buffered frames and/or request that the size of buffer 216 be adjusted. In response, first device 210 may send the requested buffered features for frames and/or adjust the size of buffer 216, e.g., to store features for more or fewer than m frames/images.

In this manner, first device 210 represents an example of a device for processing feature set data formed from media data, including: a memory configured to store feature set data and media data; and a processing system comprising one or more processors implemented in circuitry, the processing system being configured to: perform a first part of a computing graph on a set of the media data to form a feature map, the first part of the computing graph representing first processing tasks performed by the device, the device comprising a first network entity, wherein a second part of the computing graph corresponds to second processing tasks to be performed by a second network entity; buffer at least a portion of the media data in the memory; compress the feature map to form a compressed feature map; and send the compressed feature map and additional data corresponding to the buffered at least portion of the media data to the second network entity to enable the second network entity to perform the second part of the computing graph using the feature map and the additional data.

Likewise, second device 220 represents an example of a device for processing feature set data formed from media data, including: a memory configured to store feature set data and media data; and a processing system comprising one or more processors implemented in circuitry, the processing system being configured to: receive a compressed feature map including features extracted from media data and processed according to a first part of a computing graph and additional data from a second network entity, the additional data corresponding to at least a portion of the media data that was buffered by the second network entity; decompress the compressed feature map; and perform a second part of the computing graph on the feature map using the additional data, the second part of the computing graph corresponding to processing tasks to be performed by the first network entity.

Figure 9:
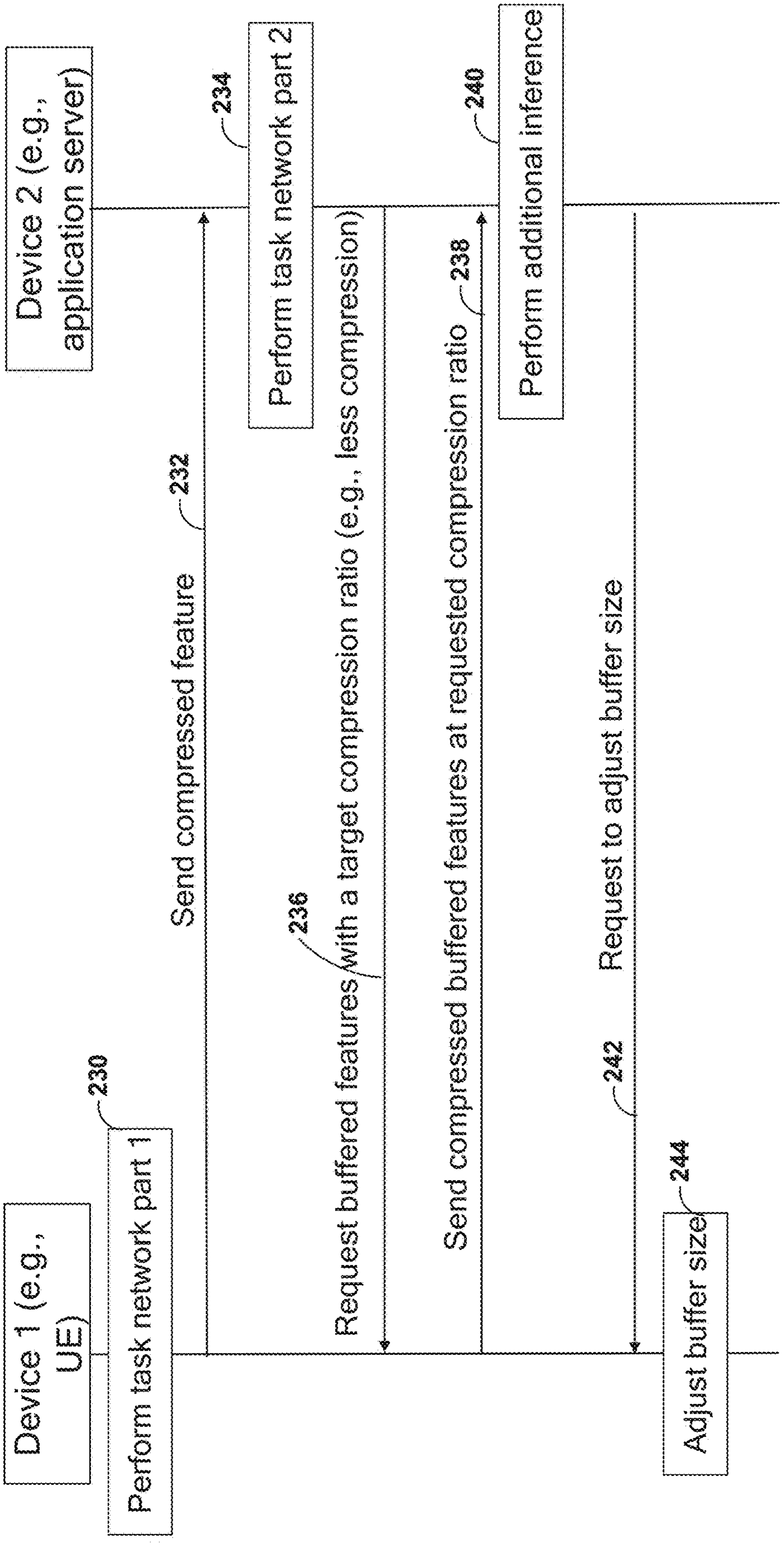
FIG. 9 is a call flow diagram illustrating an example method that may be performed by the system architecture of FIG. 8 according to techniques of this disclosure.

FIG. 9 is a call flow diagram illustrating an example method that may be performed by the system architecture of FIG. 8 according to techniques of this disclosure. The method of FIG. 9 may be performed by first device 210 and second device 220 of FIG. 8.

Initially, first device 210 (e.g., a UE) may perform task network part 1 (230). That is, first device 210 may extract a feature set from one or more images of media data. Task network part 1 212 may process the feature set according to a first portion of a task network, to form an intermediate feature set. Feature compression unit 214 may buffer the features for a certain number of frames and encode the intermediate feature set, and first device 210 may then send the compressed feature set to second device 220 (232). First device 210 may also buffer the feature set in buffer 216.

Feature decompression unit 222 of second device 220 may decode the intermediate feature set. Then, task network part 2 224 may perform the second set of processing tasks (a second part of the computing graph) (234). Based on analysis of the task results, second device 220 may request buffered features for the frames from first device 210 (236). For example, second device 220 may detect a particular object from the feature set. In response, first device 210 may send features for one or more pictures or frames of video data from buffer 216 to second device 220, according to the request (238). In particular, the features for the one or more pictures or frames may be encoded with less loss (e.g., at a higher bitrate) than the intermediate feature set initially sent to second device 220.

Second device 220 may use the additional data (the features extracted from the one or more pictures or frames of video data from buffer 216, in this example) to perform additional inference processing (240). In this example, second device 220 also requests that first device 210 adjust the size of buffer 216 (242), e.g., to increase or decrease the buffer size based on results of the additional inference processing. In response, first device 210 may adjust the size of buffer 216 according to the request form second device 220 (244).

In this manner, the method of FIG. 9 represents an example of a method of processing feature set data formed from media data, including: performing, by a first network entity (e.g., first device 210 of FIG. 8), a first part of a computing graph on a set of media data to form a feature map, the first part of the computing graph representing first processing tasks performed by the first network entity, wherein a second part of the computing graph corresponds to second processing tasks to be performed by a second network entity; buffering, by the first network entity, at least a portion of the media data; compressing, by the first network entity, the feature map to form a compressed feature map; and sending, by the first entity, the compressed feature map and additional data corresponding to the buffered at least portion of the media data to the second network entity to enable the second network entity to perform the second part of the computing graph using the feature map and the additional data.

The method of FIG. 9 also represents an example of a method of processing feature set data formed from media data, including: receiving, by a first network entity (e.g., second device 220 of FIG. 8), a compressed feature map including features extracted from media data and processed according to a first part of a computing graph and additional data from a second network entity, the additional data corresponding to at least a portion of the media data that was buffered by the second network entity; decompressing, by the first network entity, the compressed feature map; and performing, by the first network entity, a second part of the computing graph on the feature map using the additional data, the second part of the computing graph corresponding to processing tasks to be performed by the first network entity.

Figure 10:
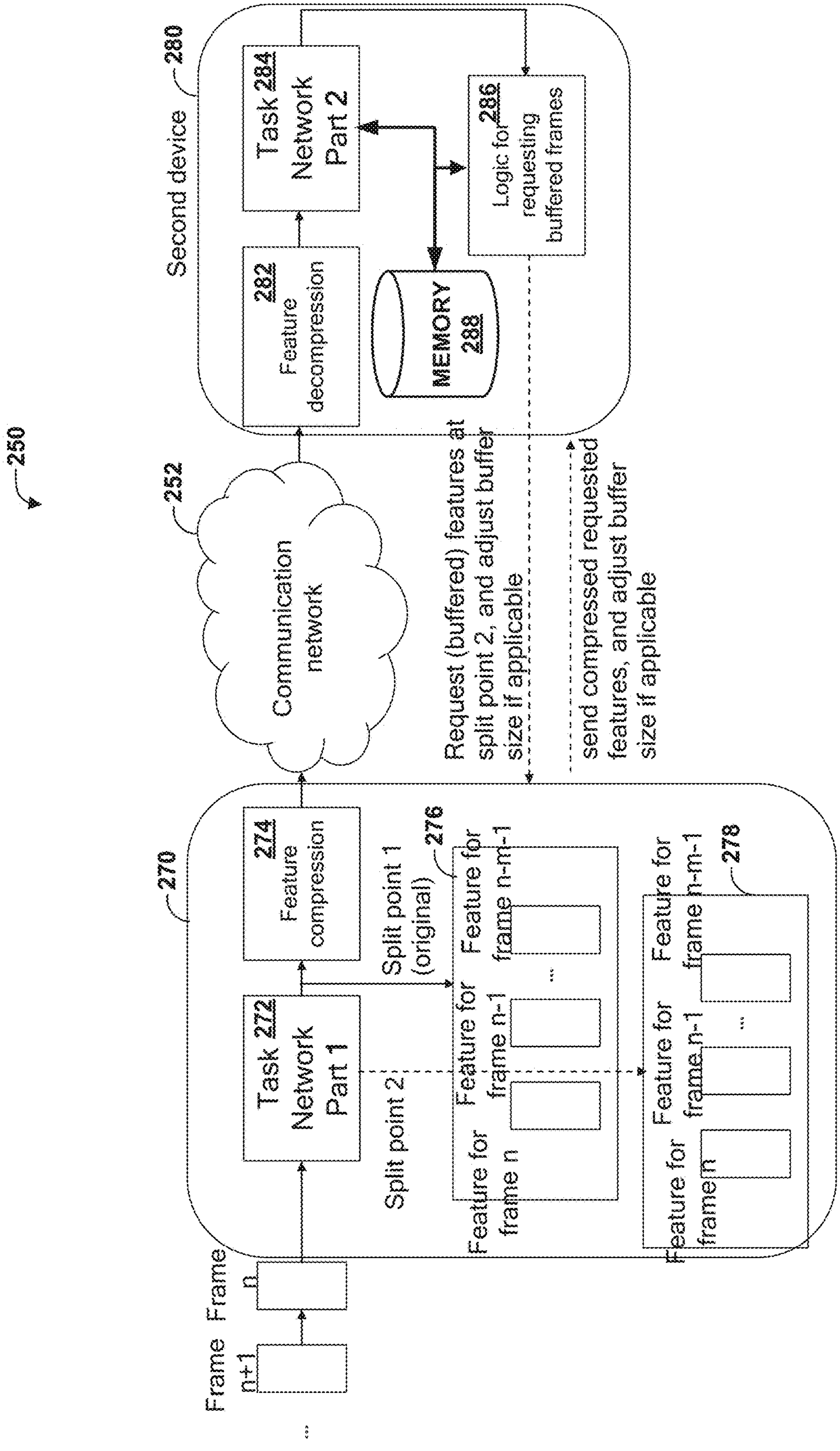
FIG. 10 is a block diagram illustrating another example system architecture for performing techniques of this disclosure.

FIG. 10 is a block diagram illustrating another example system architecture for performing techniques of this disclosure. According to the example of FIG. 10, a first network entity may send additional data in the form of compressed features corresponding to some images or video frames, but extracted using a different part of a task network, e.g., ending with a different split point that may improve inference performance relative to the initial split point or using additional or fewer tasks of the task network.

As shown in the example of FIG. 6, first device 270 (a first network entity) includes task network part 1 272, feature compression unit 274, buffer 276 to store features for m frames of media data extracted according to an original task network part 1 up to a first split point, and buffer 278 to store features for the m frames of media data up to a second split point (e.g., a new task network part 1 that is only part of the original task network part 1 or includes the original task network part 1). Task network part 1 272 and feature compression unit 274 may be implemented in hardware, software, firmware, or any combination thereof (and when implemented in software or firmware, requisite processing circuitry and storage media for storing instructions to be executed may be provided).

Buffers 276 and 278 may refer to any storage media (one or more storage devices) that can store image or video data and/or feature data until later requested (or discarded). Buffers 276 and 278 may be configured to operate as a first-in, first-out (FIFO) buffer, such that once buffer 276/278 is full, if new data object (image, video frame, or feature set) is received, an oldest-received data object still in the buffer may be discarded to allow for storage of the new data object.

In this example, second device 280 (a second network entity) includes feature decompression unit 282, task network part 2 284, and logic for requesting buffered features and/or frames 286. Memory 288 may refer to any storage media (one or more storage devices) for storing feature set/map data and media data. Logic for requesting buffered features and/or frames 286 may request buffered frames and/or features from first device 270 and store the received frames and/or features to memory 288. Feature decompression unit 282 may also store decompressed feature sets to memory 288, and task network part 2 284 may retrieve the decompressed feature sets and/or media data from memory 288 when performing the second set of processing tasks of the computing graph.

First device 270 and second device 280 communicate via communication network 252, which may correspond to the Internet.

As discussed above, logic for requesting buffered features and/or frames 286 of second device 280 may request additional data based on, e.g., one or more of detection of an object, confidence of an inference result, estimated quality of the depicted communication network, predicted quality of the communication network, computing capability of the first device, and/or a latency requirement of a particular feature processing task. In this example, the additional data may include images of buffer 276 and/or features for the image frames buffered in buffer 278 of first device 270 that were extracted and/or processed according to a split point that is different from the original split point associated with buffer 276.

The features may be for one or more of frames n, n−1, . . . n−m−1. That is, the logic for requesting the buffered frames 286 (which may be implemented in hardware, software, firmware, or a combination thereof) may request the features for one or more of the buffered frames and/or request that the size of buffer 276 and/or the size of buffer 278 be adjusted. In response, first device 270 may send the requested frames and/or buffered features for the frames and/or adjust the size of buffer 276 and/or the size of buffer 278, e.g., to store features for more or fewer than m frames/images.

In this manner, first device 270 represents an example of a device for processing feature set data formed from media data, including: a memory configured to store feature set data and media data; and a processing system comprising one or more processors implemented in circuitry, the processing system being configured to: perform a first part of a computing graph on a set of the media data to form a feature map, the first part of the computing graph representing first processing tasks performed by the device, the device comprising a first network entity, wherein a second part of the computing graph corresponds to second processing tasks to be performed by a second network entity; buffer at least a portion of the media data in the memory; compress the feature map to form a compressed feature map; and send the compressed feature map and additional data corresponding to the buffered at least portion of the media data to the second network entity to enable the second network entity to perform the second part of the computing graph using the feature map and the additional data.

Likewise, second device 280 represents an example of a device for processing feature set data formed from media data, including: a memory configured to store feature set data and media data; and a processing system comprising one or more processors implemented in circuitry, the processing system being configured to: receive a compressed feature map including features extracted from media data and processed according to a first part of a computing graph and additional data from a second network entity, the additional data corresponding to at least a portion of the media data that was buffered by the second network entity; decompress the compressed feature map; and perform a second part of the computing graph on the feature map using the additional data, the second part of the computing graph corresponding to processing tasks to be performed by the first network entity.

Figure 11:
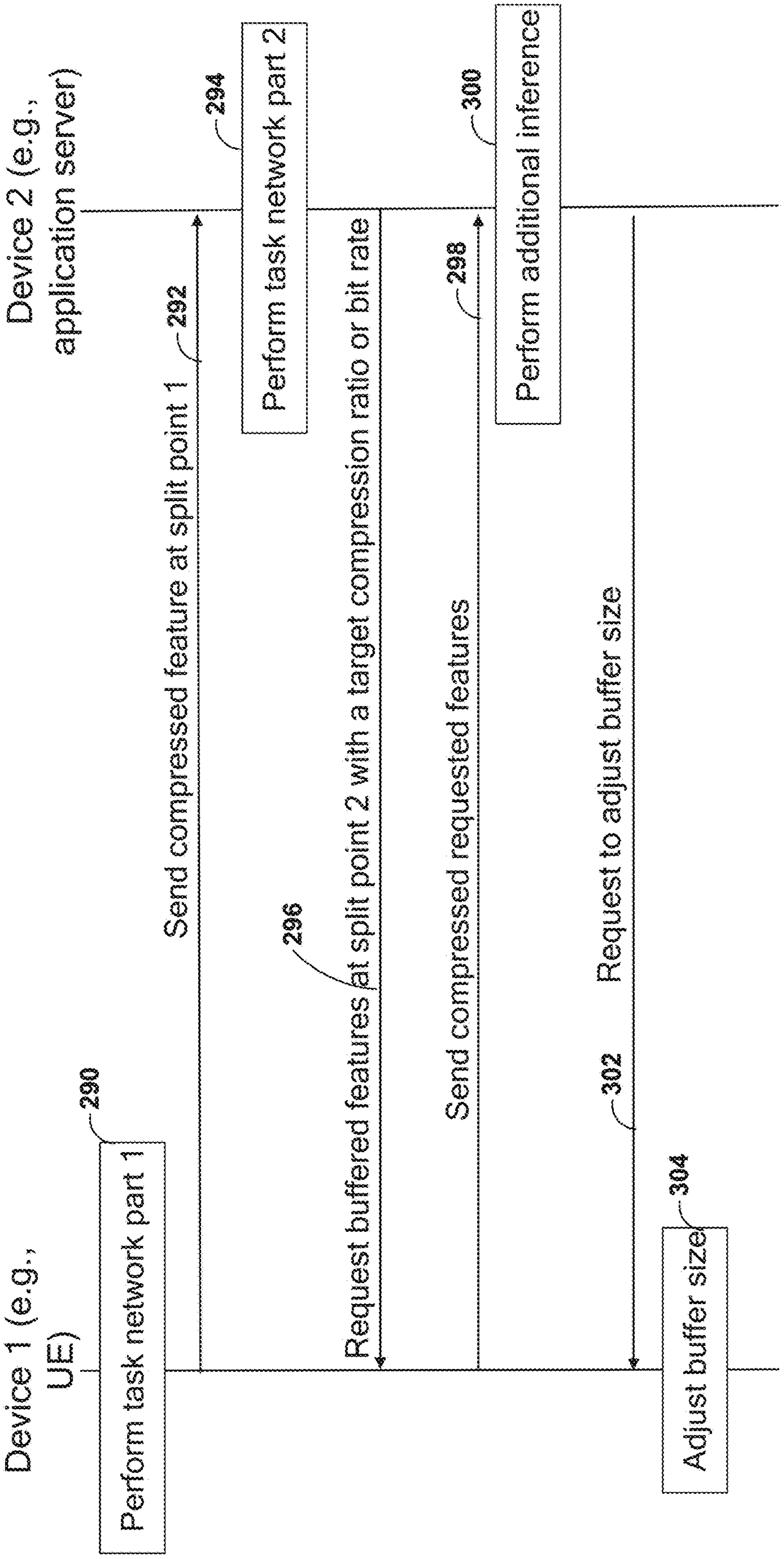
FIG. 11 is a call flow diagram illustrating an example method that may be performed by the system architecture of FIG. 10 according to techniques of this disclosure.

FIG. 11 is a call flow diagram illustrating an example method that may be performed by the system architecture of FIG. 10 according to techniques of this disclosure.

Initially, first device 270 (e.g., a UE) may perform task network part 1 (290). That is, first device 270 may extract a feature set from one or more images of media data. Task network part 1 272 with the original split point may then process the input data (e.g., video frames) according to a first portion of a task network, to form an intermediate feature set. Task network part 1 with a new split point may also process the input data and generate a different intermediate feature set. Feature compression unit 274 may compress the intermediate feature set associated with the original split point and transmit the compressed intermediate feature set to second device 280 (292). First device 270 may buffer both the feature sets associated with the original split point for a certain number of frames in buffer 276 and the feature sets associated with the second split point in buffer 278.

Feature decompression unit 282 of second device 280 may decode the intermediate feature set. Then, task network part 2 284 may perform task network part 2 (294). Based on analysis of the task results, second device 280 may request the differently processed buffered feature sets for the frames from first device 270 from buffer 278 (296). For example, second device 280 may detect a particular object from the feature set. In response, first device 270 may send the differently processed feature sets for one or more pictures or frames of video data from buffer 278 to second device 280, according to the request (298).

Second device 280 may use the additional data (the differently processed feature sets for the one or more pictures or frames of video data from buffer 278, in this example) to perform additional inference processing (300). In this example, second device 280 also requests that first device 270 adjust the size of buffer 276 and/or the size of buffer 278 (302), e.g., to increase or decrease the buffer size(s) based on results of the additional inference processing. In response, first device 270 may adjust the size of buffer 276 and/or of buffer 278 according to the request form second device 280 (304).

In this manner, the method of FIG. 11 represents an example of a method of processing feature set data formed from media data, including: performing, by a first network entity (e.g., first device 270 of FIG. 10), a first part of a computing graph on a set of media data to form a feature map, the first part of the computing graph representing first processing tasks performed by the first network entity, wherein a second part of the computing graph corresponds to second processing tasks to be performed by a second network entity; buffering, by the first network entity, at least a portion of the media data; compressing, by the first network entity, the feature map to form a compressed feature map; and sending, by the first entity, the compressed feature map and additional data corresponding to the buffered at least portion of the media data to the second network entity to enable the second network entity to perform the second part of the computing graph using the feature map and the additional data.

The method of FIG. 11 also represents an example of a method of processing feature set data formed from media data, including: receiving, by a first network entity (e.g., second device 280 of FIG. 10), a compressed feature map including features extracted from media data and processed according to a first part of a computing graph and additional data from a second network entity, the additional data corresponding to at least a portion of the media data that was buffered by the second network entity; decompressing, by the first network entity, the compressed feature map; and performing, by the first network entity, a second part of the computing graph on the feature map using the additional data, the second part of the computing graph corresponding to processing tasks to be performed by the first network entity.

Various examples of the techniques of this disclosure are summarized in the following clauses:

Clause 1: A method of processing feature set data formed from media data, the method comprising: performing, by a first network entity, a first set of processing tasks of a series of processing tasks to be performed on a set of media data to form a feature map, the first set of processing tasks corresponding to tasks to be performed by the first network entity, wherein a second set of processing tasks of the series of processing tasks is to be performed by a second network entity; buffering, by the first network entity, at least a portion of the media data; encoding, by the first network entity, the feature map to form an encoded feature map; sending, by the first entity, the encoded feature map and additional data corresponding to the buffered at least portion of the media data to the second network entity to enable the second network entity to perform the second set of processing tasks using the feature map and the additional data.

Clause 2: The method of clause 1, wherein the first network entity comprises a user equipment (UE) and the second network entity comprises an application server (AS).

Clause 3: The method of any of clauses 1 and 2, wherein the additional data comprises at least one of buffered images or video frames, a set of features compressed to a lower degree than the encoded feature map, enhancement data of the features of the encoded feature map, or compressed features corresponding to the buffered at least portion of the media data at a different split point.

Clause 4: The method of any of clauses 1-3, wherein sending the additional data comprises sending the additional data in response to a request for the additional data from the second network entity.

Clause 5: The method of clause 4, wherein the request identifies images or video frames by at least one of sequence numbers or a time interval.

Clause 6: The method of any of clauses 4 and 5, wherein the request specifies a compression ratio or target bit rate for the additional data.

Clause 7: The method of any of clauses 4-6, wherein the request includes data specifying at least one of a cause for the request or a priority for the request.

Clause 8: The method of any of clauses 1-7, further comprising receiving a request to increase or decrease a size of a buffer used to buffer the at least portion of the media data.

Clause 9: The method of clause 8, wherein the request specifies the size according to a number of images or video frames or a number of features.

Clause 10: The method of any of clauses 8 and 9, wherein the request specifies the size according to a period of time to be covered by the buffered at least portion of the media data.

Clause 11: The method of any of clauses 8-10, further comprising increasing or decreasing the buffered at least portion of the media data according to the request.

Clause 12: The method of clause 1, wherein the first network entity comprises a user equipment (UE) and the second network entity comprises an application server (AS).

Clause 13: The method of clause 1, wherein the additional data comprises at least one of buffered images or video frames, a set of features compressed to a lower degree than the encoded feature map, enhancement data of the features of the encoded feature map, or compressed features corresponding to the buffered at least portion of the media data at a different split point.

Clause 14: The method of clause 1, wherein sending the additional data comprises sending the additional data in response to a request for the additional data from the second network entity.

Clause 15: The method of clause 14, wherein the request identifies images or video frames by at least one of sequence numbers or a time interval.

Clause 16: The method of clause 14, wherein the request specifies a compression ratio or target bit rate for the additional data.

Clause 17: The method of clause 14, wherein the request includes data specifying at least one of a cause for the request or a priority for the request.

Clause 18: The method of clause 1, further comprising receiving a request to increase or decrease a size of a buffer used to buffer the at least portion of the media data.

Clause 19: The method of clause 18, wherein the request specifies the size according to a number of images or video frames or a number of features.

Clause 20: The method of clause 18, wherein the request specifies the size according to a period of time to be covered by the buffered at least portion of the media data.

Clause 21: The method of clause 18, further comprising increasing or decreasing the buffered at least portion of the media data according to the request.

Clause 22: A method of processing feature set data formed from media data, the method comprising: receiving, by a first network entity, an encoded feature map including features extracted from media data and additional data from a second network entity, the additional data corresponding to at least portion of the media data that was buffered by the second network entity; decoding, by the first network entity, the encoded feature map; and performing, by the first network entity, one or more processing tasks on the encoded feature map using the additional data.

Clause 23: The method of clause 22, wherein the first network entity comprises an application server (AS) and the second network entity comprises a user equipment (UE).

Clause 24: The method of any of clauses 22 and 23, wherein the additional data comprises at least one of buffered images or video frames, a set of features compressed to a lower degree than the encoded feature map, enhancement data of the features of the encoded feature map, or compressed features corresponding to the buffered at least portion of the media data at a different split point.

Clause 25: The method of any of clauses 22-24, further comprising sending a request for the additional data to the second network entity.

Clause 26: The method of clause 25, further comprising specifying, in the request, identifiers for images or video frames by at least one of sequence numbers or a time interval.

Clause 27: The method of any of clauses 25 and 26, further comprising specifying, in the request, a compression ratio or target bit rate for the additional data.

Clause 28: The method of any of clauses 25-27, wherein sending the request comprises, after processing the encoded feature map alone, determining that the additional data is needed.

Clause 29: The method of clause 28, wherein processing the encoded feature map alone includes at least one of detecting an object using the encoded feature map or determining that a confidence value for the encoded feature map is below a threshold.

Clause 30: The method of any of clauses 25-29, wherein sending the request comprises sending the request based on at least one of an estimated communication network quality, a predicted communication network quality, a computing capability of the second network entity, or a latency requirement of the one or more processing tasks.

Clause 31: The method of any of clauses 22-30, further comprising sending a request to increase or decrease a size of a buffer used to buffer the at least portion of the media data.

Clause 32: The method of clause 31, further comprising specifying, in the request, the size according to a number of images or video frames or a number of features.

Clause 33: The method of any of clauses 31 and 32, further comprising specifying, in the request, the size according to a period of time to be covered by the buffered at least portion of the media data.

Clause 34: The method of clause 22, wherein the first network entity comprises an application server (AS) and the second network entity comprises a user equipment (UE).

Clause 35: The method of clause 22, wherein the additional data comprises at least one of buffered images or video frames, a set of features compressed to a lower degree than the encoded feature map, enhancement data of the features of the encoded feature map, or compressed features corresponding to the buffered at least portion of the media data at a different split point.

Clause 36: The method of clause 22, further comprising sending a request for the additional data to the second network entity.

Clause 37: The method of clause 36, further comprising specifying, in the request, identifiers for images or video frames by at least one of sequence numbers or a time interval.

Clause 38: The method of clause 36, further comprising specifying, in the request, a compression ratio or target bit rate for the additional data.

Clause 39: The method of clause 25, wherein sending the request comprises, after processing the encoded feature map alone, determining that the additional data is needed.

Clause 40: The method of clause 39, wherein processing the encoded feature map alone includes at least one of detecting an object using the encoded feature map or determining that a confidence value for the encoded feature map is below a threshold.

Clause 41: The method of clause 25, wherein sending the request comprises sending the request based on at least one of an estimated communication network quality, a predicted communication network quality, a computing capability of the second network entity, or a latency requirement of the one or more processing tasks.

Clause 42: The method of clause 22, further comprising sending a request to increase or decrease a size of a buffer used to buffer the at least portion of the media data.

Clause 43: The method of clause 42, further comprising specifying, in the request, the size according to a number of images or video frames or a number of features.

Clause 44: The method of clause 42, further comprising specifying, in the request, the size according to a period of time to be covered by the buffered at least portion of the media data.

Clause 45: A device for retrieving media data, the device comprising one or means for performing the method of any of clauses 1-44.

Clause 46: The device of clause 45, wherein the one or more means comprise one or more processors implemented in circuitry.

Clause 47: The apparatus of clause 45, wherein the apparatus comprises at least one of: an integrated circuit; a microprocessor; and a wireless communication device.

Clause 48: A computer-readable storage medium having stored thereon instructions that, when executed, cause one or more processors to perform the method of any of clauses 1-44.

Clause 49: A method of processing feature set data formed from media data, the method comprising: performing, by a first network entity, a first part of a computing graph on a set of media data to form a feature map, the first part of the computing graph representing first processing tasks performed by the first network entity, wherein a second part of the computing graph corresponds to second processing tasks to be performed by a second network entity; buffering, by the first network entity, at least a portion of the media data; compressing, by the first network entity, the feature map to form a compressed feature map; and sending, by the first entity, the compressed feature map and additional data corresponding to the buffered at least portion of the media data to the second network entity to enable the second network entity to perform the second part of the computing graph using the feature map and the additional data.

Clause 50: The method of clause 49, wherein the first network entity comprises a user equipment (UE) and the second network entity comprises an application server (AS).

Clause 51: The method of clause 49, wherein the additional data comprises at least one of buffered images or video frames, a set of features compressed to a lower degree than the compressed feature map, enhancement data of the features of the compressed feature map, or compressed features corresponding to the buffered at least portion of the media data at a different split point.

Clause 52: The method of clause 49, wherein sending the compressed feature map comprises sending the compressed feature map at a first time, the method further comprising receiving a request for the additional data at a second time later than the first time, wherein sending the additional data comprises sending the additional data in response to the request for the additional data at a third time later than the second time.

Clause 53: The method of clause 52, wherein the request identifies images or video frames by at least one of sequence numbers or a time interval.

Clause 54: The method of clause 52, wherein the request specifies a compression ratio or target bit rate for the additional data.

Clause 55: The method of clause 52, wherein the request includes data specifying at least one of a cause for the request or a priority for the request.

Clause 56: The method of clause 49, further comprising receiving a request to increase or decrease a size of a buffer used to buffer the at least portion of the media data.

Clause 57: The method of clause 56, wherein the request specifies the size according to a number of images or video frames or a number of features.

Clause 58: The method of clause 56, wherein the request specifies the size according to a period of time to be covered by the buffered at least portion of the media data.

Clause 59: The method of clause 56, further comprising increasing or decreasing the buffered at least portion of the media data according to the request.

Clause 60: The method of clause 49, wherein the first and second processing tasks include one or more of object detection, object tracking, or instance segmentation.

Clause 61: A device for processing feature set data formed from media data, the device comprising: a memory configured to store feature set data and media data; and a processing system comprising one or more processors implemented in circuitry, the processing system being configured to: perform a first part of a computing graph on a set of the media data to form a feature map, the first part of the computing graph representing first processing tasks performed by the device, the device comprising a first network entity, wherein a second part of the computing graph corresponds to second processing tasks to be performed by a second network entity; buffer at least a portion of the media data in the memory; compress the feature map to form a compressed feature map; and send the compressed feature map and additional data corresponding to the buffered at least portion of the media data to the second network entity to enable the second network entity to perform the second part of the computing graph using the feature map and the additional data.

Clause 62: The device of clause 61, wherein the device comprises a user equipment (UE) and the second network entity comprises an application server (AS).

Clause 63: The device of clause 61, wherein the additional data comprises at least one of buffered images or video frames, a set of features compressed to a lower degree than the compressed feature map, enhancement data of the features of the compressed feature map, or compressed features corresponding to the buffered at least portion of the media data at a different split point.

Clause 64: The device of clause 61, wherein the processing system is configured to send the compressed feature map at a first time, wherein the processing system is further configured to receive a request for the additional data at a second time later than the first time, and wherein the processing system is configured to send the additional data in response to the request for the additional data at a third time later than the second time.

Clause 65: The device of clause 64, wherein the request includes one or more of data identifying images or video frames by at least one of sequence numbers or a time interval, data specifying a compression ratio or target bit rate for the additional data, or data specifying at least one of a cause for the request or a priority for the request.

Clause 66: The device of clause 61, wherein the processing system is further configured to receive a request to increase or decrease a size of a buffer used to buffer the at least portion of the media data.

Clause 67: The device of clause 66, wherein the request specifies the size according to a number of images or video frames or a number of features.

Clause 68: The device of clause 66, wherein the request specifies the size according to a period of time to be covered by the buffered at least portion of the media data.

Clause 69: The device of clause 66, wherein the processing system is further configured to increase or decrease the buffered at least portion of the media data according to the request.

Clause 70: A method of processing feature set data formed from media data, the method comprising: receiving, by a first network entity, a compressed feature map including features extracted from media data and processed according to a first part of a computing graph and additional data from a second network entity, the additional data corresponding to at least a portion of the media data that was buffered by the second network entity; decompressing, by the first network entity, the compressed feature map; and performing, by the first network entity, a second part of the computing graph on the feature map using the additional data, the second part of the computing graph corresponding to processing tasks to be performed by the first network entity.

Clause 71: The method of clause 70, wherein the first network entity comprises an application server (AS) and the second network entity comprises a user equipment (UE).

Clause 72: The method of clause 70, wherein the additional data comprises at least one of buffered images or video frames, a set of features compressed to a lower degree than the compressed feature map, enhancement data of the features of the compressed feature map, or compressed features corresponding to the buffered at least portion of the media data at a different split point.

Clause 73: The method of clause 70, further comprising sending a request for the additional data to the second network entity, wherein receiving the compressed feature map comprises receiving the compressed feature map at a first time, wherein sending the request comprises sending the request at a second time later than the first time, and wherein receiving the additional data comprises receiving the additional data at a third time later than the second time.

Clause 74: The method of clause 73, further comprising specifying, in the request, identifiers for images or video frames by at least one of sequence numbers or a time interval.

Clause 75: The method of clause 73, further comprising specifying, in the request, a compression ratio or target bit rate for the additional data.

Clause 76: The method of clause 73, wherein sending the request comprises, after processing the compressed feature map alone, determining that the additional data is needed.

Clause 77: The method of clause 76, wherein processing the compressed feature map alone includes at least one of detecting an object using the compressed feature map or determining that a confidence value for the compressed feature map is below a threshold.

Clause 78: The method of clause 73, wherein sending the request comprises sending the request based on at least one of an estimated communication network quality, a predicted communication network quality, a computing capability of the second network entity, or a latency requirement of the one or more processing tasks.

Clause 79: The method of clause 70, further comprising sending a request to increase or decrease a size of a buffer used to buffer the at least portion of the media data.

Clause 80: The method of clause 79, further comprising specifying, in the request, the size according to a number of images or video frames or a number of features.

Clause 81: The method of clause 79, further comprising specifying, in the request, the size according to a period of time to be covered by the buffered at least portion of the media data.

Clause 82: The method of clause 70, wherein the processing tasks include at least one of object detection, object tracking, or instance segmentation.

Clause 83: A device for processing feature set data formed from media data, the device comprising: a memory configured to store feature set data and media data; and a processing system comprising one or more processors implemented in circuitry, the processing system being configured to: receive a compressed feature map including features extracted from media data and processed according to a first part of a computing graph and additional data from a second network entity, the additional data corresponding to at least a portion of the media data that was buffered by the second network entity; decompress the compressed feature map; and perform a second part of the computing graph on the feature map using the additional data, the second part of the computing graph corresponding to processing tasks to be performed by the first network entity.

Clause 84: The device of clause 83, wherein the processing system is configured to receive the compressed feature map at a first time, send a request for the additional data at a second time later than the first time, and receive the additional data at a third time later than the second time.

Clause 85: A method of processing feature set data formed from media data, the method comprising: performing, by a first network entity, a first part of a computing graph on a set of media data to form a feature map, the first part of the computing graph representing first processing tasks performed by the first network entity, wherein a second part of the computing graph corresponds to second processing tasks to be performed by a second network entity; buffering, by the first network entity, at least a portion of the media data; compressing, by the first network entity, the feature map to form a compressed feature map; and sending, by the first entity, the compressed feature map and additional data corresponding to the buffered at least portion of the media data to the second network entity to enable the second network entity to perform the second part of the computing graph using the feature map and the additional data.

Clause 86: The method of clause 85, wherein the first network entity comprises a user equipment (UE) and the second network entity comprises an application server (AS).

Clause 87: The method of any of clauses 85 and 86, wherein the additional data comprises at least one of buffered images or video frames, a set of features compressed to a lower degree than the compressed feature map, enhancement data of the features of the compressed feature map, or compressed features corresponding to the buffered at least portion of the media data at a different split point.

Clause 88: The method of any of clauses 85-87, wherein sending the compressed feature map comprises sending the compressed feature map at a first time, the method further comprising receiving a request for the additional data at a second time later than the first time, wherein sending the additional data comprises sending the additional data in response to the request for the additional data at a third time later than the second time.

Clause 89: The method of clause 88, wherein the request identifies images or video frames by at least one of sequence numbers or a time interval.

Clause 90: The method of any of clauses 88 and 89, wherein the request specifies a compression ratio or target bit rate for the additional data.

Clause 91: The method of any of clauses 88-90, wherein the request includes data specifying at least one of a cause for the request or a priority for the request.

Clause 92: The method of any of clauses 85-91, further comprising receiving a request to increase or decrease a size of a buffer used to buffer the at least portion of the media data.

Clause 93: The method of clause 92, wherein the request specifies the size according to a number of images or video frames or a number of features.

Clause 94: The method of any of clauses 92 and 93, wherein the request specifies the size according to a period of time to be covered by the buffered at least portion of the media data.

Clause 95: The method of any of clauses 92-94, further comprising increasing or decreasing the buffered at least portion of the media data according to the request.

Clause 96: The method of any of clauses 85-95, wherein the first and second processing tasks include one or more of object detection, object tracking, or instance segmentation.

Clause 97: A device for processing feature set data formed from media data, the device comprising: a memory configured to store feature set data and media data; and a processing system comprising one or more processors implemented in circuitry, the processing system being configured to: perform a first part of a computing graph on a set of the media data to form a feature map, the first part of the computing graph representing first processing tasks performed by the device, the device comprising a first network entity, wherein a second part of the computing graph corresponds to second processing tasks to be performed by a second network entity; buffer at least a portion of the media data in the memory; compress the feature map to form a compressed feature map; and send the compressed feature map and additional data corresponding to the buffered at least portion of the media data to the second network entity to enable the second network entity to perform the second part of the computing graph using the feature map and the additional data.

Clause 98: The device of clause 97, wherein the processing system is configured to send the compressed feature map at a first time, wherein the processing system is further configured to receive a request for the additional data at a second time later than the first time, and wherein the processing system is configured to send the additional data in response to the request for the additional data at a third time later than the second time.

Clause 99: The device of any of clauses 97 and 98, wherein the additional data comprises at least one of buffered images or video frames, a set of features compressed to a lower degree than the compressed feature map, enhancement data of the features of the compressed feature map, or compressed features corresponding to the buffered at least portion of the media data at a different split point.

Clause 100: A method of processing feature set data formed from media data, the method comprising: receiving, by a first network entity, a compressed feature map including features extracted from media data and processed according to a first part of a computing graph and additional data from a second network entity, the additional data corresponding to at least a portion of the media data that was buffered by the second network entity; decompressing, by the first network entity, the compressed feature map; and performing, by the first network entity, a second part of the computing graph on the feature map using the additional data, the second part of the computing graph corresponding to processing tasks to be performed by the first network entity.

Clause 101: The method of clause 100, wherein the first network entity comprises an application server (AS) and the second network entity comprises a user equipment (UE).

Clause 102: The method of any of clauses 100 and 101, wherein the additional data comprises at least one of buffered images or video frames, a set of features compressed to a lower degree than the compressed feature map, enhancement data of the features of the compressed feature map, or compressed features corresponding to the buffered at least portion of the media data at a different split point.

Clause 103: The method of any of clauses 100-102, further comprising sending a request for the additional data to the second network entity, wherein receiving the compressed feature map comprises receiving the compressed feature map at a first time, wherein sending the request comprises sending the request at a second time later than the first time, and wherein receiving the additional data comprises receiving the additional data at a third time later than the second time.

Clause 104: The method of clause 103, further comprising specifying, in the request, identifiers for images or video frames by at least one of sequence numbers or a time interval.

Clause 105: The method of any of clauses 103 and 104, further comprising specifying, in the request, a compression ratio or target bit rate for the additional data.

Clause 106: The method of any of clauses 103-105, wherein sending the request comprises, after processing the compressed feature map alone, determining that the additional data is needed.

Clause 107: The method of clause 106, wherein processing the compressed feature map alone includes at least one of detecting an object using the compressed feature map or determining that a confidence value for the compressed feature map is below a threshold.

Clause 108: The method of any of clauses 100-107, wherein sending the request comprises sending the request based on at least one of an estimated communication network quality, a predicted communication network quality, a computing capability of the second network entity, or a latency requirement of the one or more processing tasks.

Clause 109: The method of any of clauses 100-108, further comprising sending a request to increase or decrease a size of a buffer used to buffer the at least portion of the media data.

Clause 110: The method of clause 109, further comprising specifying, in the request, the size according to a number of images or video frames or a number of features.

Clause 111: The method of any of clauses 109 and 110, further comprising specifying, in the request, the size according to a period of time to be covered by the buffered at least portion of the media data.

Clause 112: The method of any of clauses 100-111, wherein the processing tasks include at least one of object detection, object tracking, or instance segmentation.

Clause 113: A device for processing feature set data formed from media data, the device comprising: a memory configured to store feature set data and media data; and a processing system comprising one or more processors implemented in circuitry, the processing system being configured to: receive a compressed feature map including features extracted from media data and processed according to a first part of a computing graph and additional data from a second network entity, the additional data corresponding to at least a portion of the media data that was buffered by the second network entity; decompress the compressed feature map; and perform a second part of the computing graph on the feature map using the additional data, the second part of the computing graph corresponding to processing tasks to be performed by the first network entity.

Clause 114: The device of clause 113, wherein the processing system is configured to receive the compressed feature map at a first time, send a request for the additional data at a second time later than the first time, and receive the additional data at a third time later than the second time.

Clause 115: A device for processing feature set data formed from media data, the device comprising: means for performing a first part of a computing graph on a set of media data to form a feature map, the first part of the computing graph representing first processing tasks performed by the device, wherein a second part of the computing graph corresponds to second processing tasks to be performed by a second network entity separate from the device; means for buffering at least a portion of the media data; means for compressing the feature map to form a compressed feature map; and means for sending the compressed feature map and additional data corresponding to the buffered at least portion of the media data to the second network entity to enable the second network entity to perform the second part of the computing graph using the feature map and the additional data.

Clause 116: A device for processing feature set data formed from media data, the device comprising: means for receiving a compressed feature map including features extracted from media data and processed according to a first part of a computing graph and additional data from a second network entity, the additional data corresponding to at least a portion of the media data that was buffered by the second network entity; means for decompressing the compressed feature map; and means for performing a second part of the computing graph on the feature map using the additional data, the second part of the computing graph corresponding to processing tasks to be performed by the first network entity.

Clause 117: A computer-readable storage medium having stored thereon instructions that, when executed, cause a processor of a first network entity to: perform a first part of a computing graph on a set of the media data to form a feature map, the first part of the computing graph representing first processing tasks performed by the device, the device comprising a first network entity, wherein a second part of the computing graph corresponds to second processing tasks to be performed by a second network entity; buffer at least a portion of the media data in the memory; compress the feature map to form a compressed feature map; and send the compressed feature map and additional data corresponding to the buffered at least portion of the media data to the second network entity to enable the second network entity to perform the second part of the computing graph using the feature map and the additional data.

Clause 118: A computer-readable storage medium having stored thereon instructions that, when executed, cause a processor of a first network entity to: receive a compressed feature map including features extracted from media data and processed according to a first part of a computing graph and additional data from a second network entity, the additional data corresponding to at least a portion of the media data that was buffered by the second network entity; decompress the compressed feature map; and perform a second part of the computing graph on the feature map using the additional data, the second part of the computing graph corresponding to processing tasks to be performed by the first network entity.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing feature set data formed from media data, the method comprising:

performing, by a first network entity, a first part of a computing graph on a set of media data to form a feature map, the first part of the computing graph representing first processing tasks performed by the first network entity, wherein a second part of the computing graph corresponds to second processing tasks to be performed by a second network entity;

buffering, by the first network entity, at least a portion of the media data;

compressing, by the first network entity, the feature map to form a compressed feature map;

sending, by the first network entity, the compressed feature map to the second network entity at a first time to enable the second network entity to perform the second part of the computing graph using the feature map;

receiving, by the first network entity, a request for additional data corresponding to the buffered at least portion of the media data at a second time later than the first time from the second network entity, the additional data representing an enhanced quality version of the buffered at least portion of the media data; and in response to the request:

generating, by the first network entity, the additional data from the buffered at least portion of the media data; and sending, by the first network entity, the additional data to the second network entity at a third time later than the second time.

2. The method of claim 1, wherein the first network entity comprises a user equipment (UE) and the second network entity comprises an application server (AS).

3. The method of claim 1, wherein the additional data comprises at least one of buffered images or video frames, a set of features compressed to a lower degree than the compressed feature map, enhancement data of the features of the compressed feature map, or compressed features corresponding to the buffered at least portion of the media data at a different split point.

4. The method of claim 1, wherein the request identifies images or video frames of the additional data by at least one of sequence numbers or a time interval.

5. The method of claim 1, wherein the request specifies a compression ratio or target bit rate for the additional data.

6. The method of claim 1, wherein the request includes data specifying at least one of a cause for the request or a priority for the request.

7. The method of claim 1, further comprising receiving a request to increase or decrease a size of a buffer used to buffer the at least portion of the media data.

8. The method of claim 7, wherein the request specifies the size according to a number of images or video frames or a number of features.

9. The method of claim 7, wherein the request specifies the size according to a period of time to be covered by the buffered at least portion of the media data.

10. The method of claim 7, further comprising increasing or decreasing the buffered at least portion of the media data according to the request.

11. The method of claim 1, wherein the first and second processing tasks include one or more of object detection, object tracking, or instance segmentation.

12. The method of claim 1, wherein the at least portion of the media data spans a round-trip time between the first network entity and the second network entity and a time for the second network entity to perform the second part of the computing graph.

13. The method of claim 1, wherein the compressed feature map comprises a first compressed feature map compressed at a first compression ratio, and wherein generating the additional data comprises compressing the at least portion of the media data at a second compression ratio to form the additional data to include a second compressed feature map compressed at the second compression ratio, the second compression ratio being lower than the first compression ratio.

14. A device for processing feature set data formed from media data, the device comprising:

a memory configured to store feature set data and media data; and a processing system comprising one or more processors implemented in circuitry, the processing system being configured to:

perform a first part of a computing graph on a set of the media data to form a feature map, the first part of the computing graph representing first processing tasks performed by the device, the device comprising a first network entity, wherein a second part of the computing graph corresponds to second processing tasks to be performed by a second network entity;

buffer at least a portion of the media data in the memory;

compress the feature map to form a compressed feature map;

send the compressed feature map to the second network entity at a first time to enable the second network entity to perform the second part of the computing graph using the feature map;

receive a request for additional data corresponding to the buffered at least portion of the media data at a second time later than the first time from the second network entity, the additional data representing an enhanced quality version of the buffered at least portion of the media data; and in response to the request:

generate the additional data from the buffered at least portion of the media data; and send the additional data to the second network entity at a third time later than the second time.

15. The device of claim 14, wherein the request includes one or more of data identifying images or video frames by at least one of sequence numbers or a time interval, data specifying a compression ratio or target bit rate for the additional data, or data specifying at least one of a cause for the request or a priority for the request.

16. The device of claim 14, wherein the compressed feature map comprises a first compressed feature map compressed at a first compression ratio, and wherein to generate the additional data, the processing system is configured to compress the at least portion of the media data at a second compression ratio to form the additional data to include a second compressed feature map compressed at the second compression ratio, the second compression ratio being lower than the first compression ratio.

17. A method of processing feature set data formed from media data, the method comprising:

receiving, by a first network entity, a compressed feature map including features extracted from media data and processed according to a first part of a computing graph from a second network entity at a first time;

decompressing, by the first network entity, the compressed feature map;

generating, by the first network entity, a request for additional data corresponding to the buffered at least portion of the media data at a second time later than the first time, the additional data representing an enhanced quality version of the buffered at least portion of the media data;

sending, by the first network entity, the request to the second network entity;

receiving, by the first network entity, the additional data at a third time later than the second time; and performing, by the first network entity, a second part of the computing graph on the feature map using the additional data, the second part of the computing graph corresponding to processing tasks to be performed by the first network entity.

18. The method of claim 17, wherein the first network entity comprises an application server (AS) and the second network entity comprises a user equipment (UE).

19. The method of claim 17, wherein the additional data comprises at least one of buffered images or video frames, a set of features compressed to a lower degree than the compressed feature map, enhancement data of the features of the compressed feature map, or compressed features corresponding to the buffered at least portion of the media data at a different split point.

20. The method of claim 17, further comprising specifying, in the request, identifiers for images or video frames by at least one of sequence numbers or a time interval.

21. The method of claim 17, further comprising specifying, in the request, a compression ratio or target bit rate for the additional data.

22. The method of claim 17, wherein sending the request comprises, after processing the compressed feature map alone, determining that the additional data is needed.

23. The method of claim 22, wherein processing the compressed feature map alone includes at least one of detecting an object using the compressed feature map or determining that a confidence value for the compressed feature map is below a threshold.

24. The method of claim 17, wherein sending the request comprises sending the request based on at least one of an estimated communication network quality, a predicted communication network quality, a computing capability of the second network entity, or a latency requirement of the one or more processing tasks.

25. The method of claim 17, further comprising sending a request to increase or decrease a size of a buffer used to buffer the at least portion of the media data.

26. The method of claim 25, further comprising specifying, in the request, the size according to a number of images or video frames or a number of features.

27. The method of claim 25, further comprising specifying, in the request, the size according to a period of time to be covered by the buffered at least portion of the media data.

28. The method of claim 17, wherein the processing tasks include at least one of object detection, object tracking, or instance segmentation.

29. The method of claim 17, wherein the compressed feature map comprises a first compressed feature map compressed at a first compression ratio, and wherein the additional data comprises a second compressed feature map of the at least portion of the media data compressed at a second compression ratio, the second compression ratio being lower than the first compression ratio.

30. A device for processing feature set data formed from media data, the device comprising:

a memory configured to store feature set data and media data; and a processing system comprising one or more processors implemented in circuitry, the processing system being configured to:

receive a compressed feature map including features extracted from media data and processed according to a first part of a computing graph from a second network entity;

decompress the compressed feature map;

generate a request for additional data corresponding to the buffered at least portion of the media data at a second time later than the first time, the additional data representing an enhanced quality version of the buffered at least portion of the media data;

send the request to the second network entity;

receive the additional data at a third time later than the second time; and perform a second part of the computing graph on the feature map using the additional data, the second part of the computing graph corresponding to processing tasks to be performed by the first network entity.

* * * * *